United States Patent [19]

Kiolbasa

[11] Patent Number: 5,460,265
[45] Date of Patent: Oct. 24, 1995

[54] BLANK CONSTRUCTION AND PACKAGE FOR A COMPACT DISC

[75] Inventor: Kenneth M. Kiolbasa, Hillside, Ill.

[73] Assignee: Chicago Packaging Corp., Chicago, Ill.

[21] Appl. No.: 203,345

[22] Filed: Feb. 28, 1994

[51] Int. Cl.[6] .................................................. B65D 85/57
[52] U.S. Cl. .......................... 206/308.1; 206/312
[58] Field of Search .................. 206/303, 307–313, 206/387, 444, 308.1, 308.2; 229/68 R

[56] References Cited

U.S. PATENT DOCUMENTS

| | | |
|---|---|---|
| D. 286,378 | 10/1986 | Banfield . |
| D. 329,015 | 9/1992 | Stoyanoff . |
| 3,303,603 | 7/1963 | Abeson . |
| 3,595,383 | 7/1971 | Boylan . |
| 4,411,360 | 10/1983 | Gardineer, Jr. et al. . |
| 4,566,590 | 1/1986 | Manning et al. . |
| 4,653,639 | 3/1987 | Traynor . |
| 4,694,954 | 9/1987 | Moss . |
| 4,850,731 | 7/1989 | Youngs . |
| 4,903,829 | 2/1990 | Clemens . |
| 4,925,023 | 5/1990 | Goldblatt et al. . |
| 5,088,599 | 2/1992 | Mahler . |
| 5,101,973 | 4/1992 | Martinez . |
| 5,154,284 | 10/1992 | Starkey . |
| 5,188,229 | 2/1993 | Bernstein . |
| 5,205,405 | 4/1993 | O'Brien et al. . |
| 5,248,032 | 9/1993 | Sheu et al. . |
| 5,307,927 | 5/1994 | Curtis et al. . |

*Primary Examiner*—Jimmy G. Foster
*Attorney, Agent, or Firm*—Wallenstein & Wagner, Ltd.

[57] ABSTRACT

A blank construction (11,111,211) and package (10,110,210) for storing a compact disc are disclosed comprising a back panel (20,120,220), an integral first panel (30,140,250) foldable onto the back panel (20,120,220) along a first foldable joint (91,191,291), an integral second panel (40, 160,260) having a centrally located first cut-out (45,165, 265) adapted to receive and position a compact disc therein foldable along a second foldable joint (92,192,292), an integral third panel (50,150,270) having a centrally located second cut-out (55,155,275) and adapted to partially cover the first cut-out (45,165,265) foldable along a third foldable joint (93,193,293), and an integral fourth panel (60,130,230/ 240) foldable onto the folded first panel, second panel, third panel and back panel along a fourth foldable joint (94,194, 2995/296). A flap panel (80,180,280a/280b) is foldable along a fifth foldable joint (96,195,297a/297b) onto the fourth foldable panel (60,130,230/240).

76 Claims, 15 Drawing Sheets

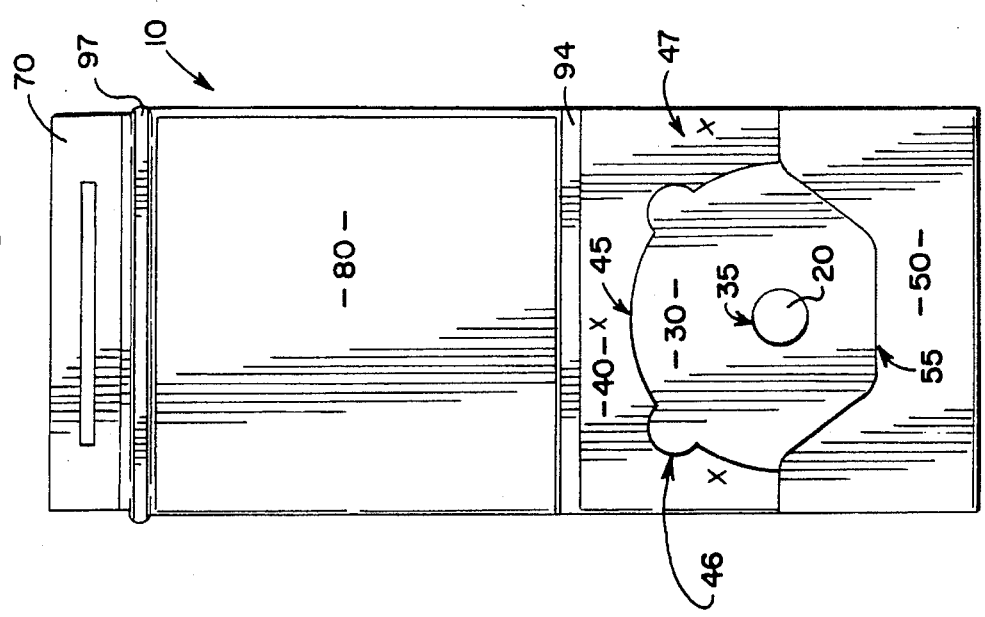
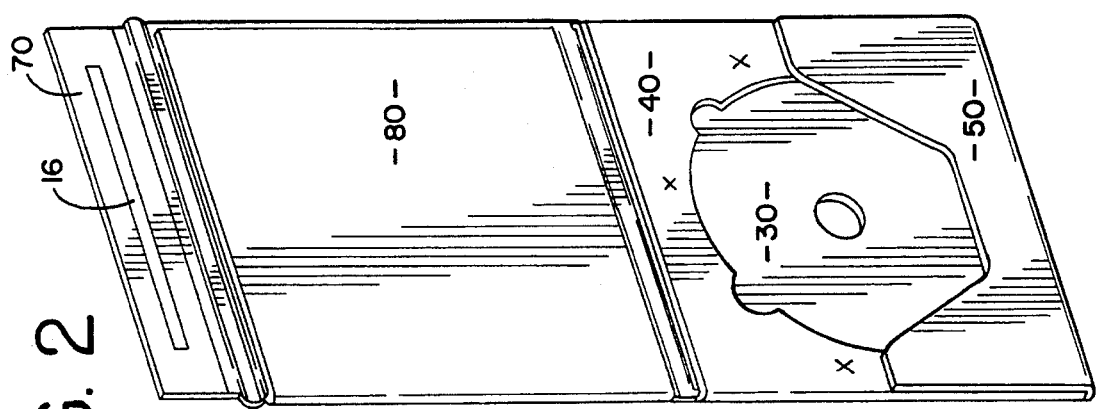
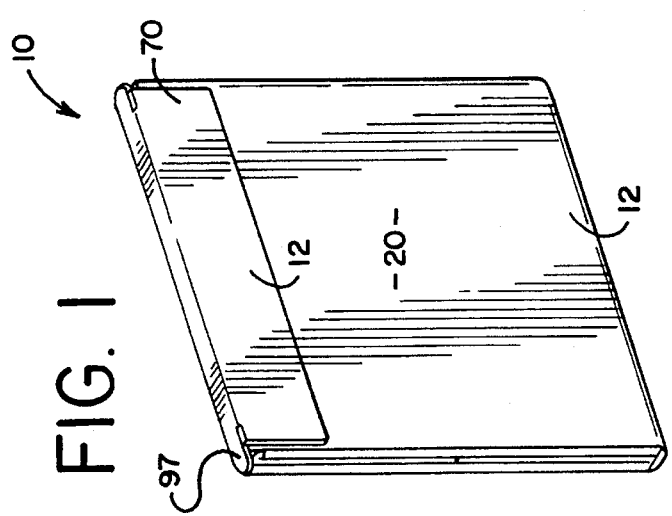

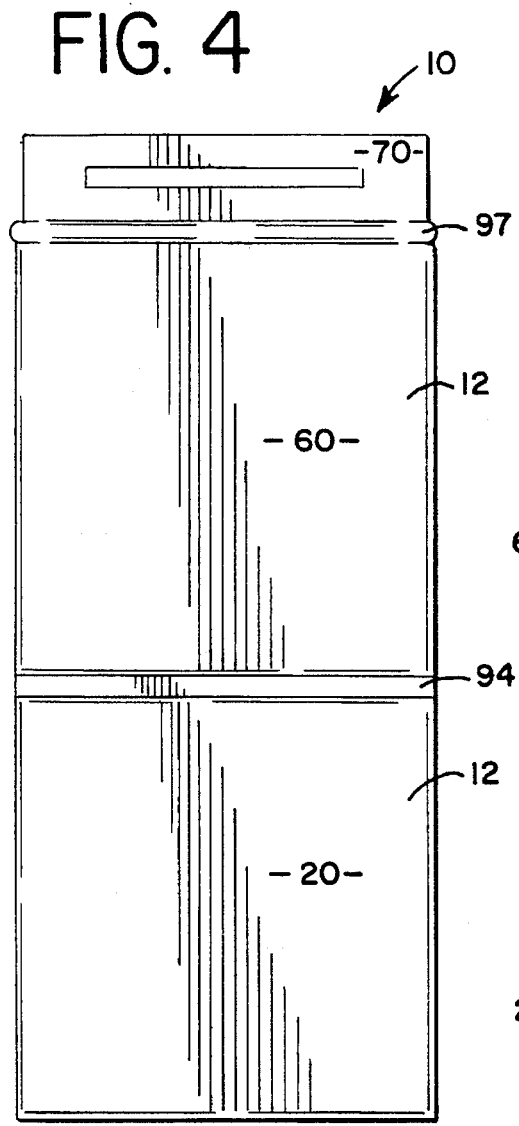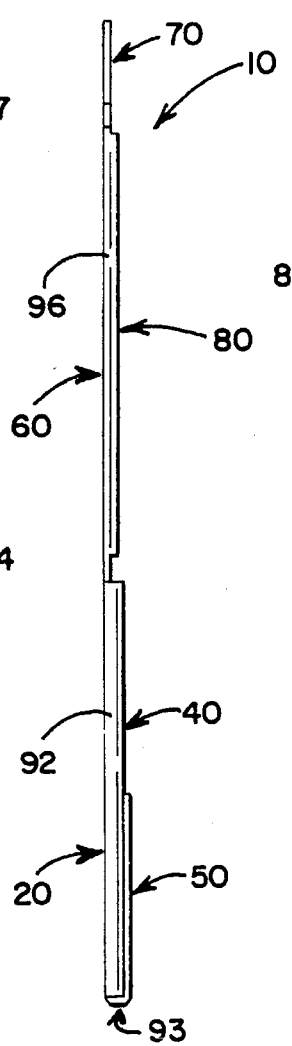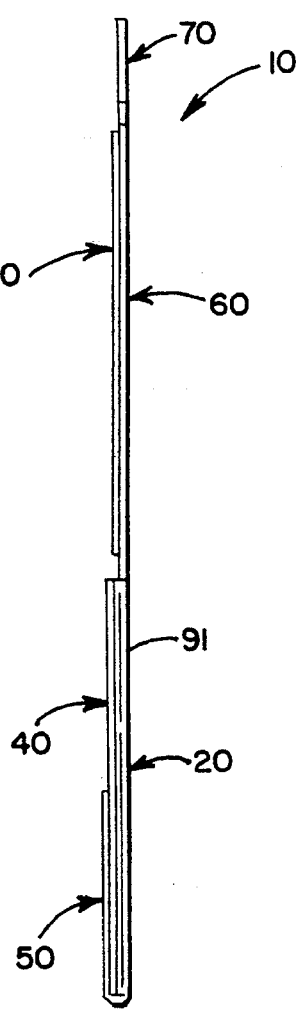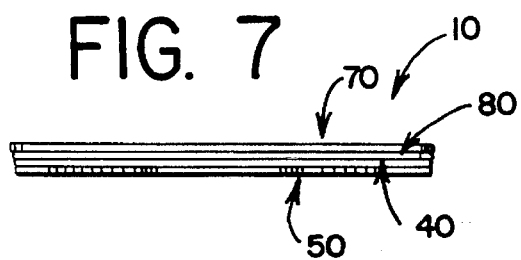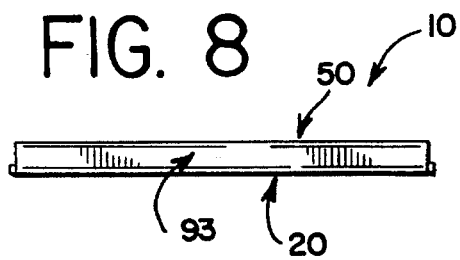

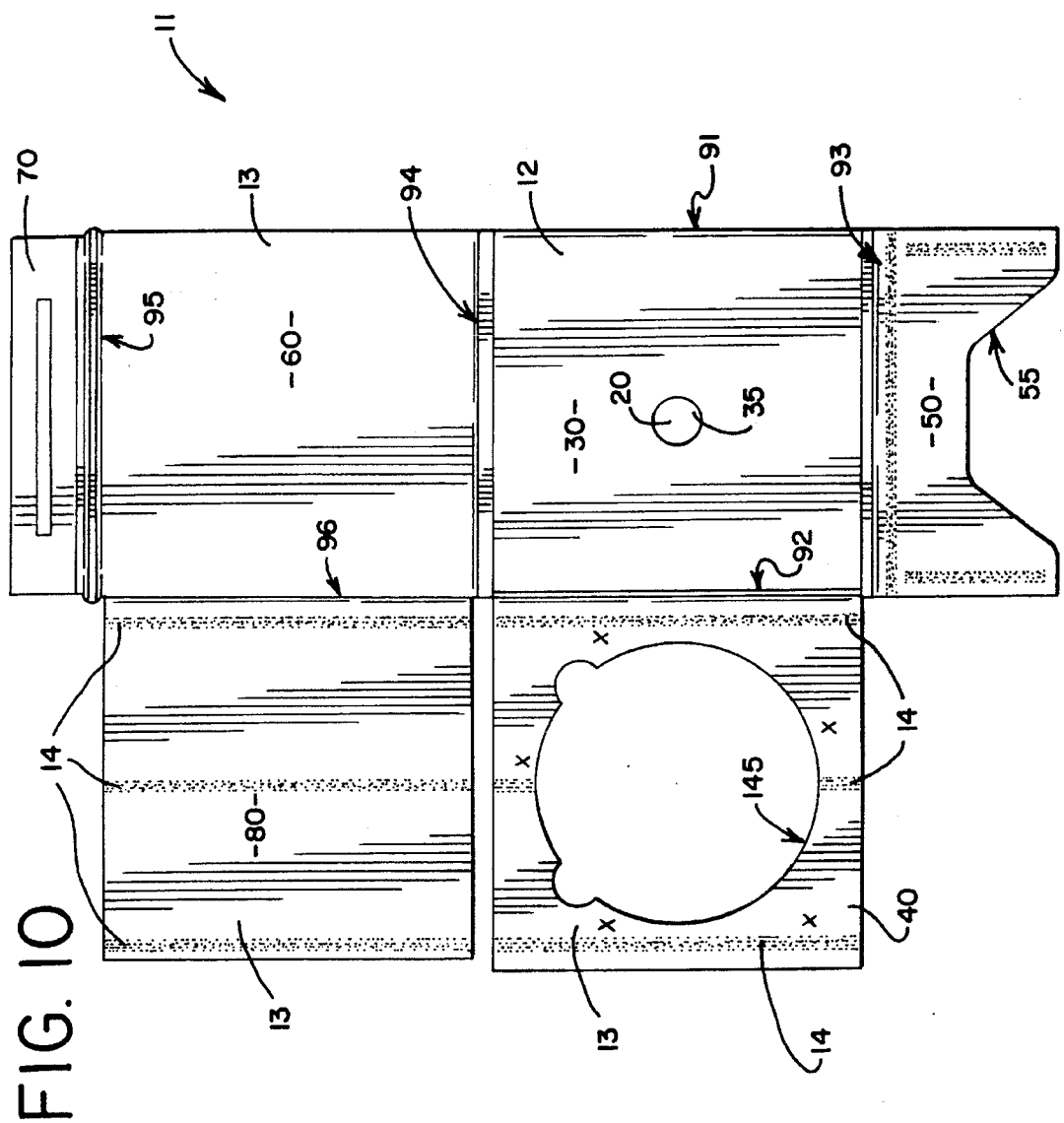

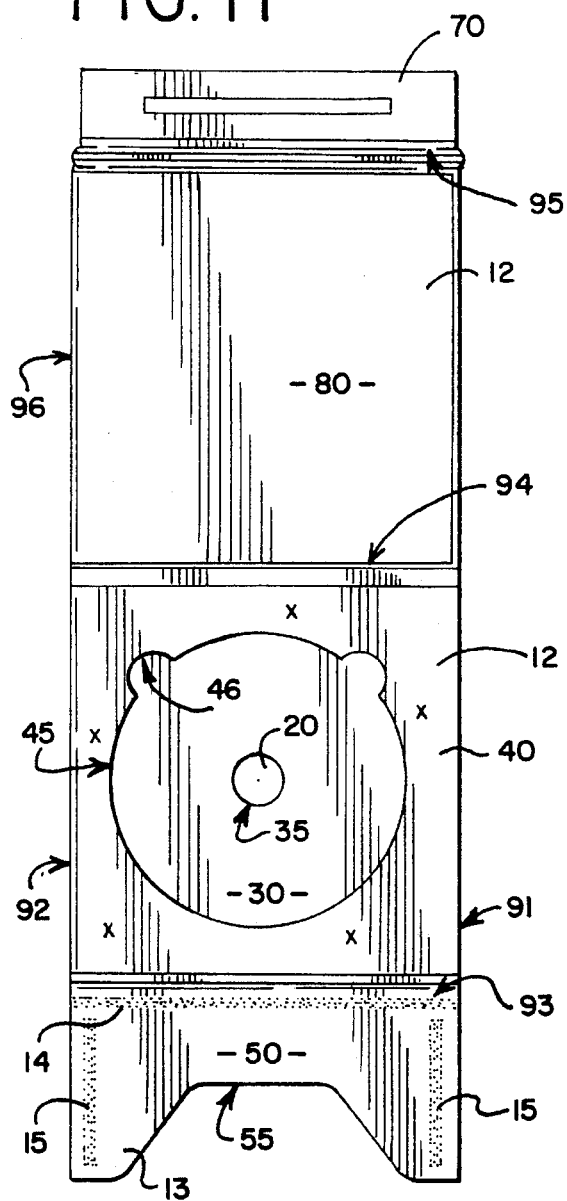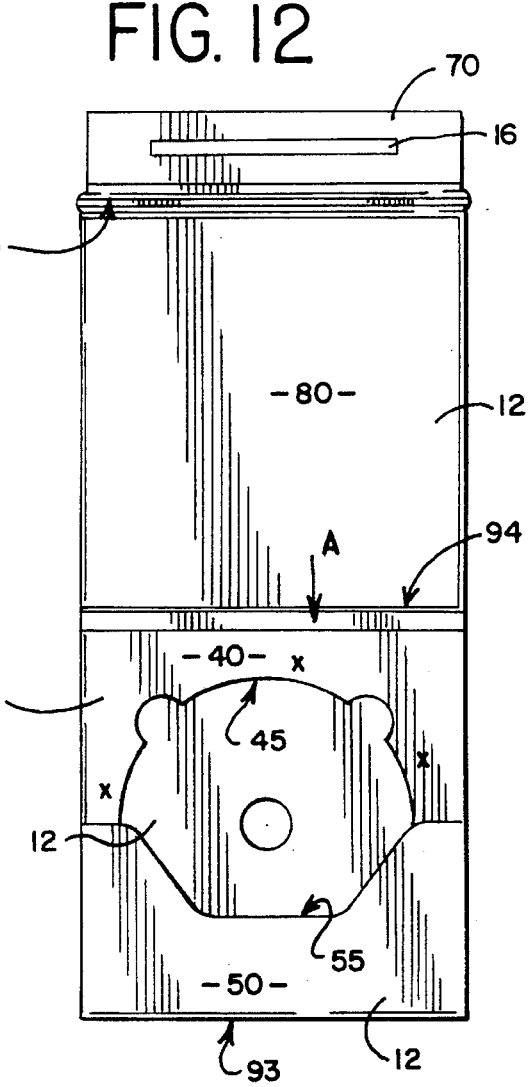

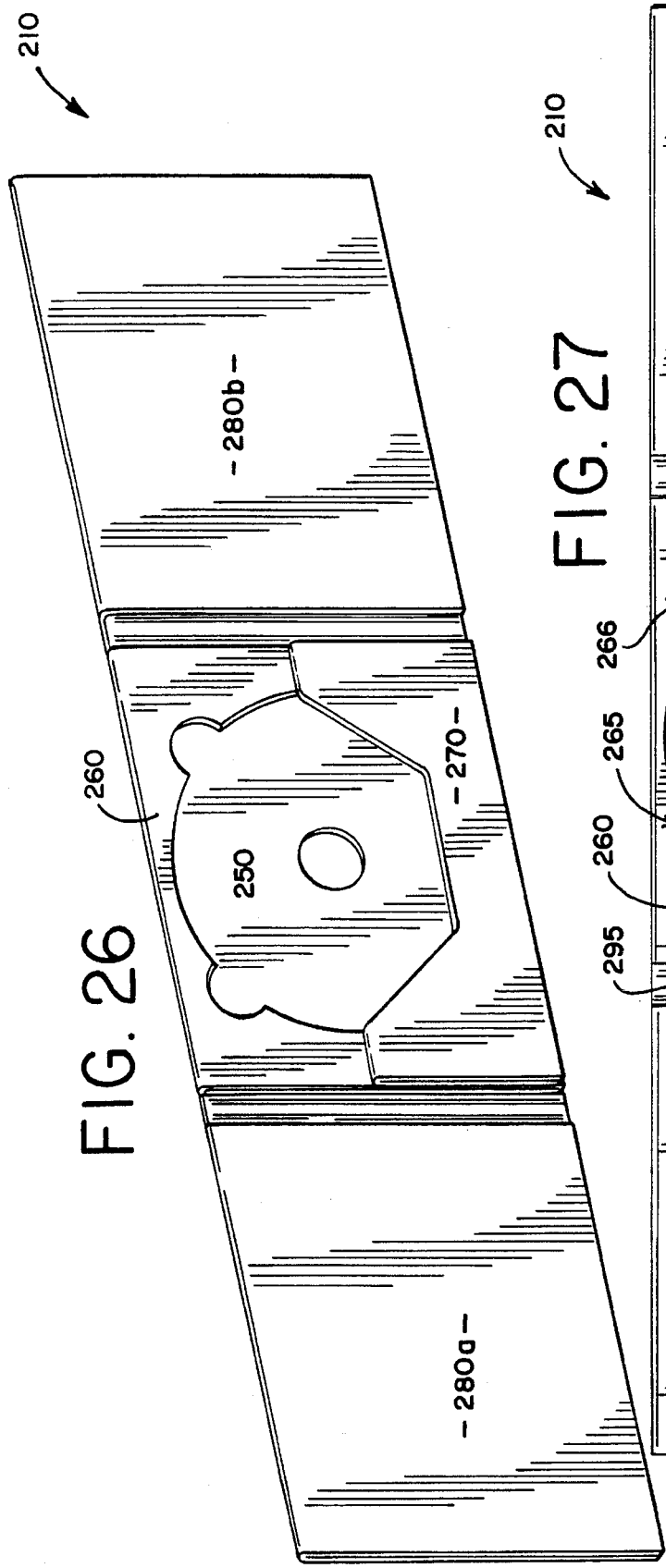
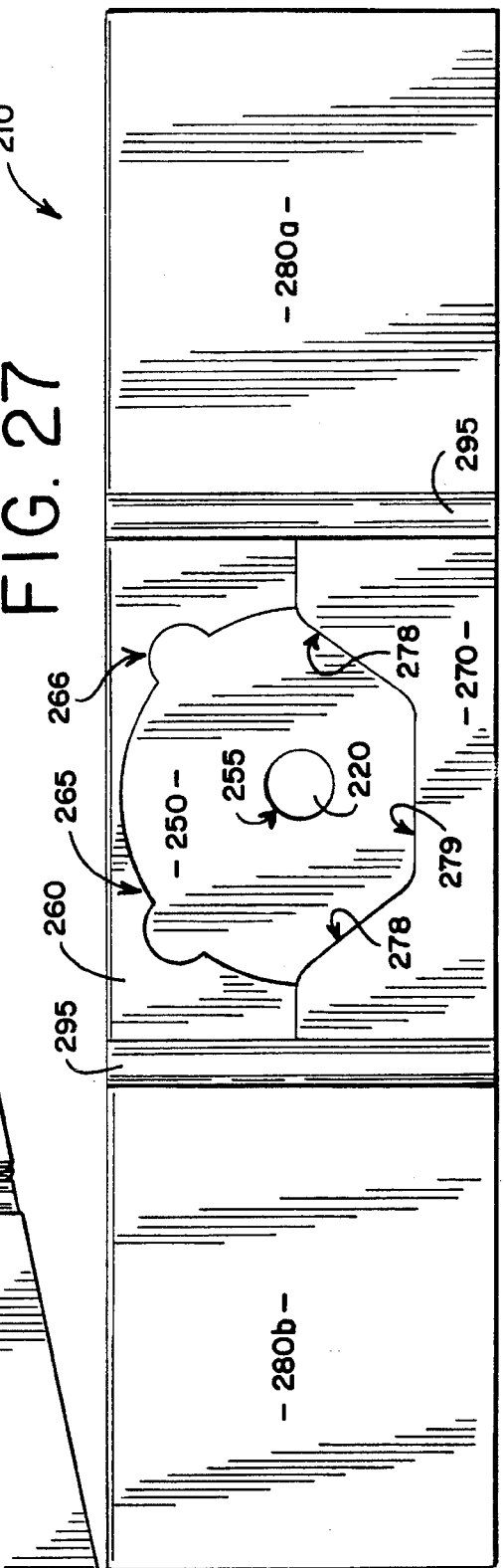

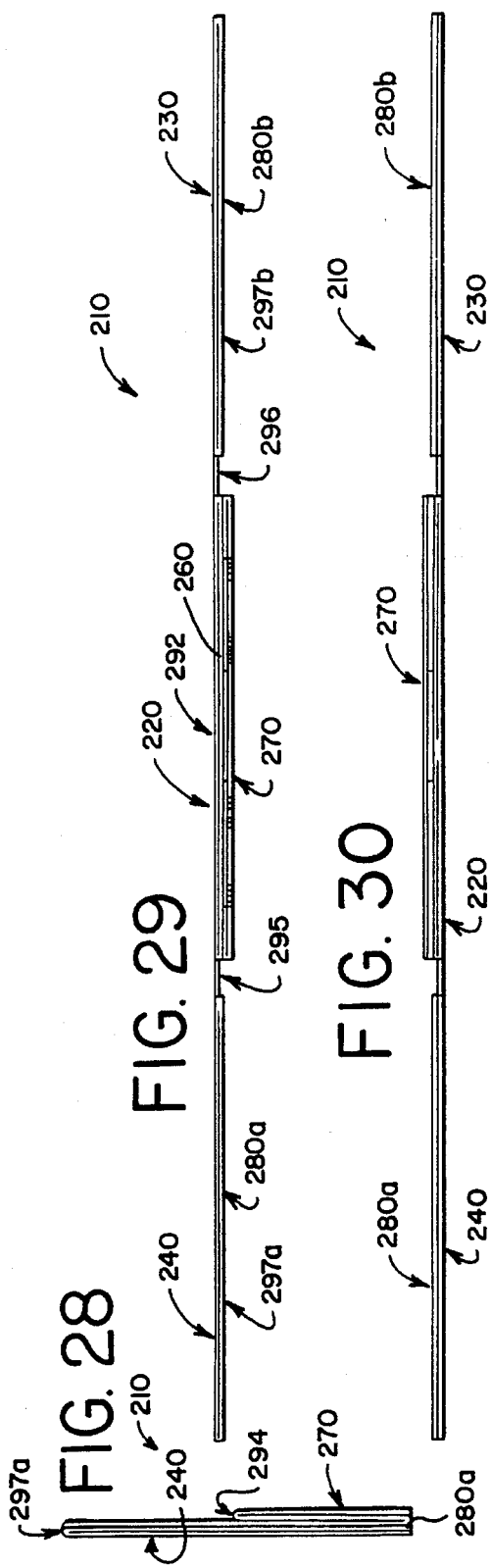

BLANK CONSTRUCTION AND PACKAGE FOR A COMPACT DISC

DESCRIPTION

1. Technical Field

The present invention relates generally to blank constructions and packages or carriers made therefrom, more particularly, to a blank construction that is foldable into a package for storing and transporting compact discs.

2. Background of the Invention

Compact discs or CD's are used today in a variety of applications including storing digitally recorded music or images for use in audio or visual equipment, and storing Read-Only Memory for use in computers. At present, compact discs, which measure 4.7 inches in diameter, are generally stored in three-piece molded plastic containers called jewel boxes. The jewel boxes comprise two thin trays hinged together with a molded plastic insert for one of the trays. The inserts have a recess for receiving the compact disc which is held by resilient fingers at the center hole of the disc. The jewel cases are expensive and not necessarily light in weight. In comparison to the discs themselves, the boxes are often cumbersome to manipulate. In addition, printed material relating to and/or identifying the contents of the disc(s) must be placed on inserts that attach to or fit within the jewel box, as opposed to directly onto the jewel box. Further, many individuals now question the impact of such boxes as waste on the environment.

Attempts have been made to construct a container for discs entirely or predominantly out of paper, cardboard or paperboard. Such attempts are shown in U.S. Pat. Nos. 5,248,032 to Sheu et al., 5,188,229 to Bernstein, 5,088,599 to Mahler, 4,653,639 to Traynor, 4,694,954 to Moss, 4,925,023 to Goldblatt et al., 5,101,973 to Martinez, and U.S. Pat. No. 5,205,405 to O'Brien et al. Despite these patents, there is still a need and desire to produce a more economical and ecological package that is "plastic-free" for storing and transporting compact discs.

In addition, there is a need for a storage case that fits on existing shelving and in other existing storage and transporting facilities. There is a further need to make such packages out of a single material with reduced labor costs. Moreover, there has been a need for packaging that permits printing and/or coating thereon to identify and/or protect the disc being stored. It is especially desired that such printing and/or coating be limited to one surface of the original blank to, again, minimize the cost of manufacturing. In addition, there is a need for a package that includes two (2) easy access pockets therein, one for the disc and one for any material such as instructions and brochures.

SUMMARY OF THE INVENTION

The present invention satisfies these just noted needs and desires. According to a first aspect of the present invention, a first embodiment of a carrier or package is formed of a blank construction for storing a compact disc. This first carrier, or blank, includes a back panel having a pair of opposed sides and a pair of opposed ends and a right side panel (first side panel) disposed adjacent to one opposed side of the back panel that is adapted to be foldable onto the back panel along a first foldable joint formed therebetween. The right side panel (first side panel) further includes a centrally located opening therein. A left side panel (second side panel) having a centrally located hole therein for receiving and positioning a compact disc therein is disposed adjacent to the other opposed side of the back panel and is adapted to be foldable onto the folded right side panel (first side panel) along a second foldable joint formed between the left side panel (second side panel) and the back panel. This left side panel (second side panel) further has two, spaced-apart arcuate radial notches adjacent the centrally located hole for exposing an edge of a compact disc positioned in the hole. A plurality of creases are formed around the perimeter of the hole in the right side panel (first side panel) for forming puckers therein. A bottom panel (first end panel) having a cut-out therein is adapted to partially cover the hole is disposed adjacent to one opposed end of the back panel and is further adapted to be foldable onto the folded left panel (second side panel) along a third foldable joint formed between the bottom panel (first end panel) and the back panel. And, a top panel (second end panel) disposed adjacent to the other opposed end of the back panel is adapted to be foldable onto the folded bottom panel (first end panel) along a fourth foldable joint.

As a result of the above described construction and folding, a first pocket for the disc is formed between the right side panel (first end panel) and bottom panel (first end panel) (the disc being held in the hole of the left side panel) (second side panel) and a second pocket is formed for instructions or advertising between the back panel and the right side panel (first side panel).

According to a further aspect of the present invention, a lap panel disposed adjacent to the other opposed end of the top panel (second end panel) is adapted to be foldable onto the folded bottom (first end), side (first and second side), and back panels along a fifth foldable joint.

According to a still further aspect of the present invention, a flap panel disposed adjacent to a side of the top panel (second end panel) is adapted to be foldable onto the top panel (second end panel) along a sixth foldable joint.

The first foldable joint comprises a single fold line, the second foldable joint comprises a single fold line, the third foldable joint comprises two parallel fold lines, the fourth foldable joint comprises two parallel fold lines, the fifth foldable joint comprises two parallel lines with a frangible connection disposed therebetween and the sixth foldable joint comprises a single foldable line. The left side panel (second side panel) includes adhesive thereon for adhering it to the right side panel (first side panel), the bottom panel includes adhesive thereon for adhering it to the left side panel (second side panel), the flap panel includes adhesive thereon for adhering it to the top panel (second side panel) and the lap panel includes adhesive thereon for adhering it to the back panel.

A single coating or lamination on one surface of the blank will serve as protection and/or indicia on all the outer surfaces of the folded package.

According to a second embodiment of the present invention, a carrier or package is formed of a second blank construction. This second carrier, or blank, includes a back panel having a pair of opposed sides and a pair of opposed ends and a left side panel (first side panel) disposed adjacent to one opposed side of the back panel that is adapted to be foldable onto the back panel along a first foldable joint formed therebetween. The left side panel (first side panel) further includes a centrally located opening therein. A top panel (first end panel) having an elongated first cut-out therein for both receiving and positioning a compact disc therein is disposed adjacent to one opposed end of the back panel and is adapted to be foldable onto the folded left side panel (first side panel) along a second foldable joint formed between the top panel (first end panel) and the back panel. This top panel (first end panel) further has two, spaced-apart, arcuate radial notches adjacent this elongated cut-out for exposing an edge of a compact disc positioned in the cut-out. A bottom panel (second end panel) having a second cut-out therein is adapted to partially cover the elongated first cut-out and is disposed adjacent to the other opposed end of the back panel and is further adapted to be foldable onto the folded top panel (first end panel) along a third foldable joint formed between the bottom panel (second end panel) and the back panel. A right side panel second side panel disposed adjacent to the other opposed side of the back panel is adapted to be foldable onto the folded bottom panel (second end panel) along a fourth foldable joint.

As a result of this construction, once folded, the package includes a first pocket for the disc (in the first cut-out of the top panel) (first panel) between the left side panel (first side panel) and the bottom panel (second end panel) and a second pocket for literature between the back panel and the left side panel (first side panel).

A flap panel disposed adjacent to the right side panel (second side panel) is adapted to be foldable onto the right side panel (right side panel) along a fifth foldable joint.

The first, second, third and fifth foldable joints comprise a single fold line and the fourth foldable joint comprises two parallel fold lines. The top panel (first end panel) includes adhesive thereon for adhering it to the left side panel (first side panel), the bottom panel includes adhesive thereon for adhering it to the top panel (first end panel), the flap panel includes adhesive thereon for adhering it to the left side panel (first side panel) and the right side panel (second side panel) includes adhesive thereon for adhering it to the flap panel.

As with the first embodiment, a single coating and laminate to only one surface of the blank will be necessary to completely cover the coated package with such coating or laminate and to protect the disc within.

According to a third embodiment of the present invention, the package is formed of a third blank construction. This third carrier, or blank, includes a back panel having pairs of opposed sides and opposed ends and a bottom panel (first end panel) disposed adjacent to one opposed end of the back panel that is adapted to be foldable onto the back panel along a first foldable joint formed therebetween. The bottom panel (first end panel) further includes a centrally located opening therein. A first top panel (second end panel) having a centrally located substantially circular first cut-out therein that is adapted to receive and position a compact disc therein is disposed adjacent to the other opposed end of the back panel. This first top panel (second end panel) is also adapted to be foldable onto the folded bottom panel (first end panel) along a second foldable joint formed between this first top panel (second end panel) and the back panel. As with the other two embodiments, this first top panel (second end panel) further has two, spaced-apart, arcuate radial notches adjacent to the first cut-out for exposing an edge of a compact disc positioned in this first cut-out. A second top panel (third end panel), having a second cut-out therein and adapted to be foldable along an intermediate, fourth foldable joint to partially cover the first cut-out, is disposed adjacent to the opposed end of the first top panel opposite the opposed end adjacent the back panel. This second top (second end panel) panel is foldable along a separate third foldable joint formed between the second top panel (second end panel) and the first top panel (second end panel) onto the folded back, bottom and first top panels (first end, second end and third end panels).

Two side panels, each disposed adjacent one opposed side of the back panel, are adapted to be folded onto the folded bottom, first top and second top panels (first end, second end and third end panels) along a fifth and sixth foldable joint. Each side panel (first side and second side panels) further has a flap panel disposed adjacent thereto that is adapted to be foldable onto the side panel (first side or second side panel) along a seventh foldable joint.

A first disc pocket is formed between the bottom panel (first end panel), second top panel (third end panel) and first top panel (first side or second side panel) and a second materials pocket is formed between the bottom panel (first end panel) and the back panel.

The first foldable joint, second foldable joint, third foldable joint, fourth foldable joint and seventh foldable joint comprise a single fold line, and the fifth foldable joint and sixth foldable joint comprise two parallel fold lines. The first top panel (third end panel) includes adhesive thereon for adhering it to the bottom panel (first end panel), the second top panel includes adhesive thereon for adhering it to itself and to the first top panel (second end panel) and the flap panels include adhesive thereon for adhering each to each panel.

Other advantages and aspects of the present invention will become apparent upon reading the following description of the drawings and detailed description of the invention.

BRIEF DESCRIPTION OF THE DRAWINGS

In order that the present invention may be more fully understood, it will now be described by way of example, with reference to the accompanying drawings in which:

FIG. 1 is a perspective front view of a first embodiment of the package in the closed position made in accordance with the teachings of the present invention;

FIG. 2 is a perspective front view of the package of FIG. 1 in the open position;

FIG. 3 is a front elevation view of the package of FIGS. 1 and 2 in the open position;

FIG. 4 is a rear elevation view of the package of FIGS. 1–3 in the open position;

FIG. 5 is a left side elevation view of the package of FIGS. 1–4 in the open position;

FIG. 6 is a right side elevation view of the package of FIGS. 1–5 in the open position;

FIG. 7 is a top plan view of the package of FIGS. 1–6 in the open position;

FIG. 8 is a bottom plan view of the package of FIGS. 1–7 in the open position;

FIG. 10 is a top plan view of the blank construction of FIG. 9 after a first fold to the blank;

FIG. 11 is a top plan view of the blank construction of FIGS. 9 and 10 after a second and a third fold to the blank;

FIG. 12 is a top plan view of the blank construction of FIGS. 9–11 after a fourth fold to the blank;

FIG. 21 is top plan view of a blank construction in the open, unfolded position used to construct the second embodiment of the package of FIGS. 13–20;

FIG. 26 is a perspective front view of the package of FIG. 25 in the open position;

FIG. 27 is a front elevation view of the package of FIGS. 25 and 26 in the open position;

FIG. 28 is a left side elevation view of the package of FIGS. 25–27 in the open position;

FIG. 29 is a top plan view of the package of FIGS. 25–28 in the open position;

FIG. 30 is a bottom plan view of the package of FIGS. 25–29 in the open position;

FIG. 31 is a rear elevation view of the package of FIGS. 25–30 in the open position;

DETAILED DESCRIPTION

Figure 9:
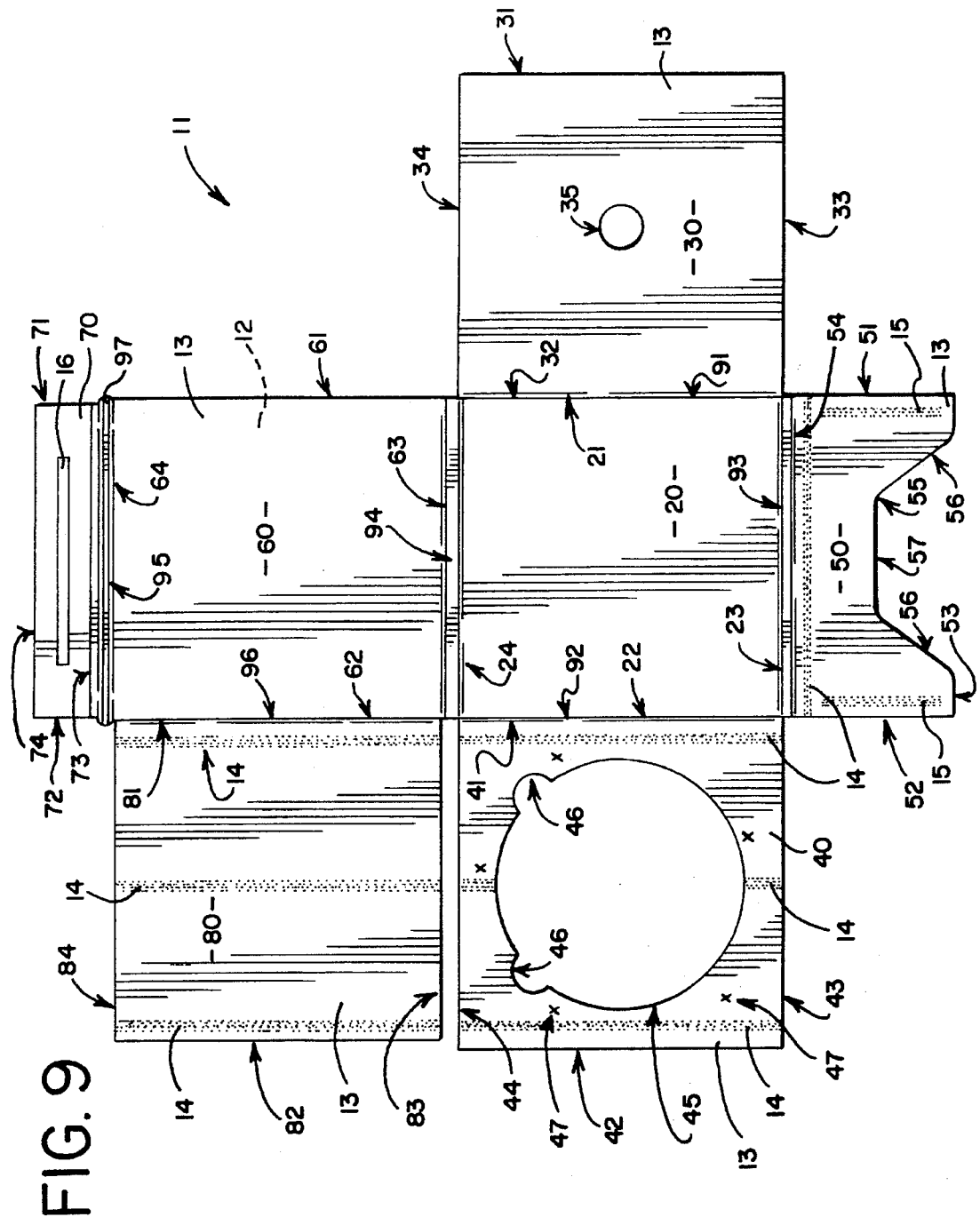
FIG. 9 is top plan view of a blank construction in the open, unfolded position used to construct the first embodiment of the package of FIGS. 1–8.
Figure 13:
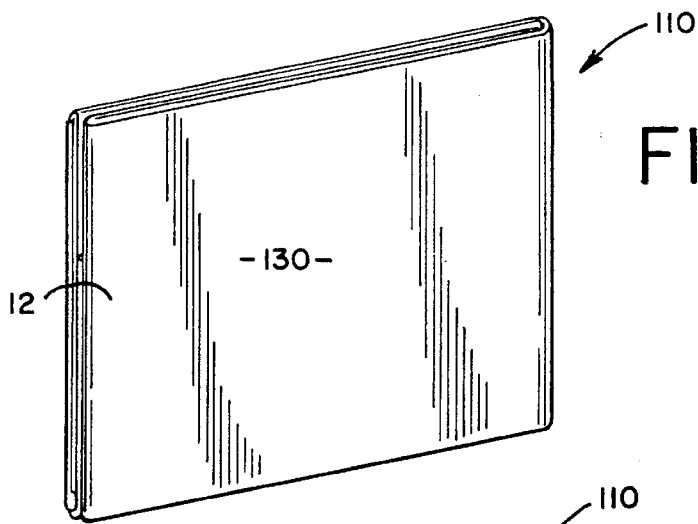
FIG. 13 is a perspective front view of a second embodiment of the package in the closed position made in accordance with the teachings of the present invention.
Figure 14:
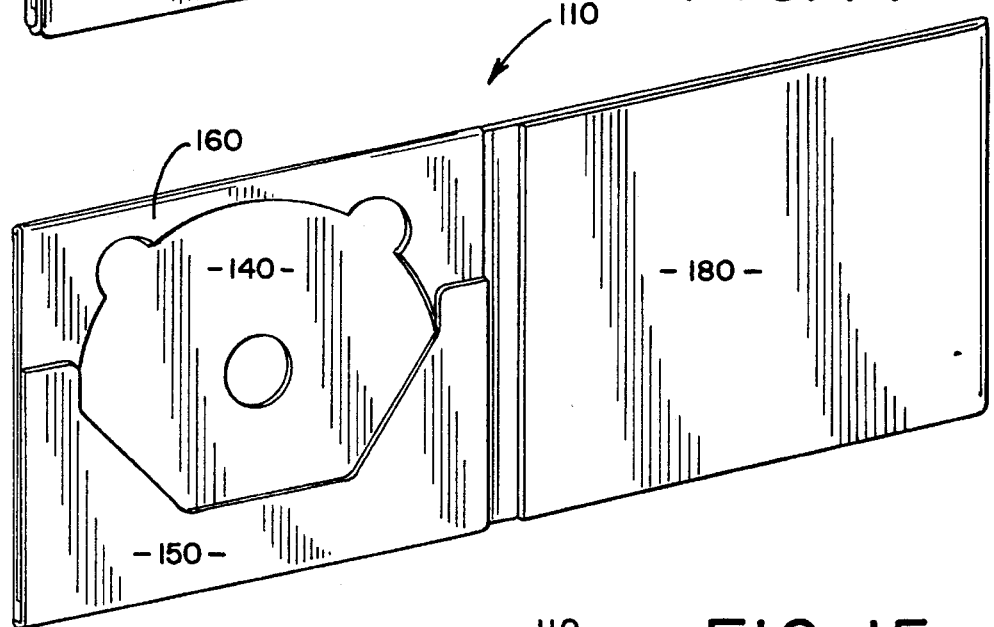
FIG. 14 is a perspective front view of the package of FIG. 13 in the open position.
Figure 15:
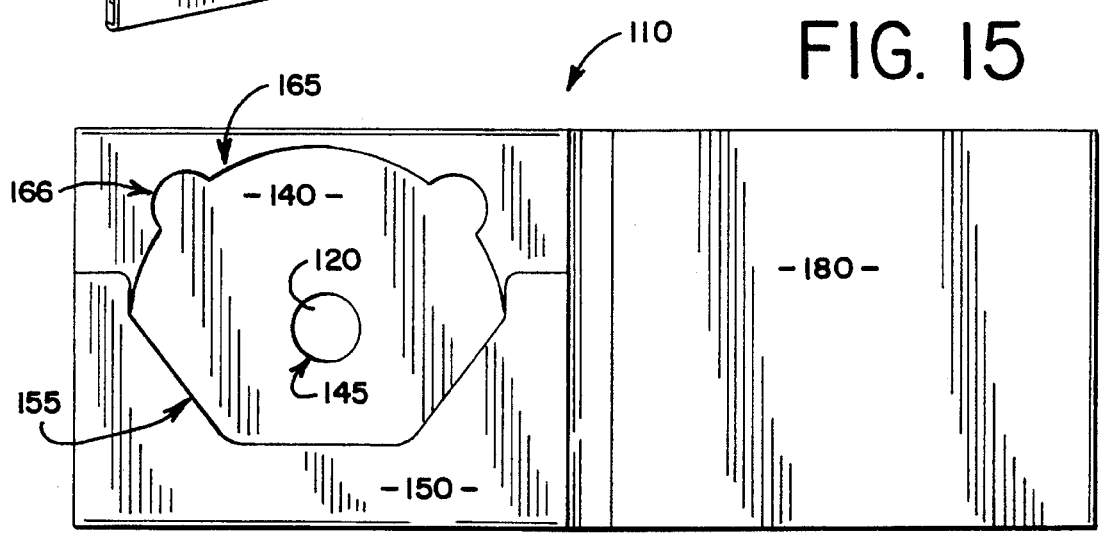
FIG. 15 is a front elevation view of the package of FIGS. 13 and 14 in the open position.
Figure 16:
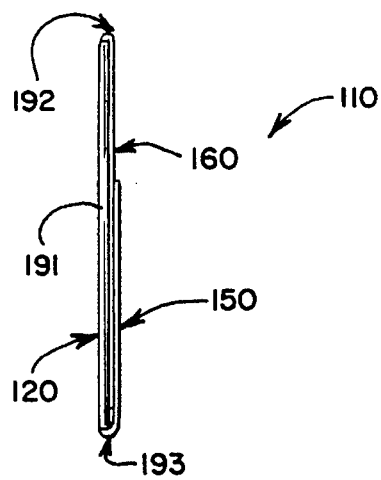
FIG. 16 is a left side elevation view of the package of FIGS. 13–15 in the open position.
Figure 17:
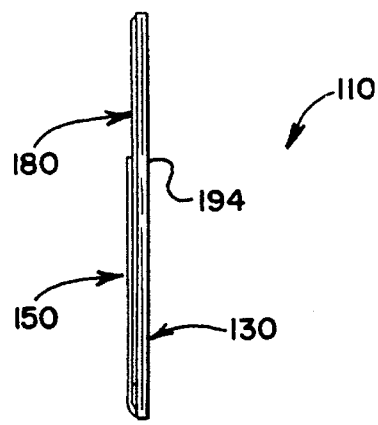
FIG. 17 is a right side elevation view of the package of FIGS. 13–16 in the open position.
Figure 18:
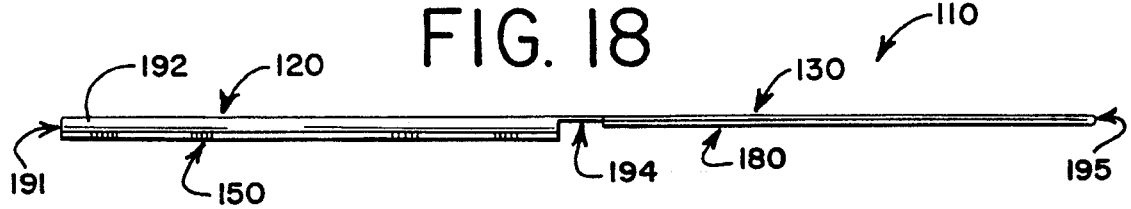
FIG. 18 is a top plan view of the package of FIGS. 13–17 in the open position.
Figure 19:
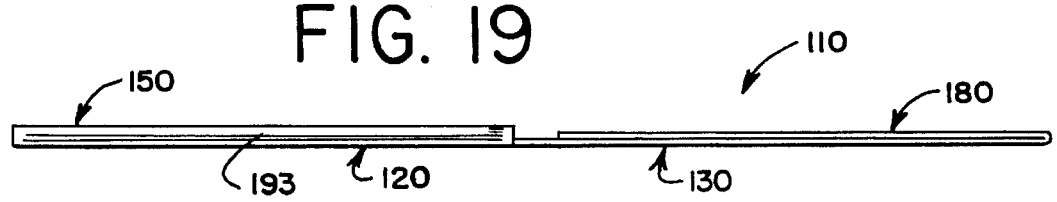
FIG. 19 is a bottom plan view of the package of FIGS. 13–18 in the open position.
Figure 20:
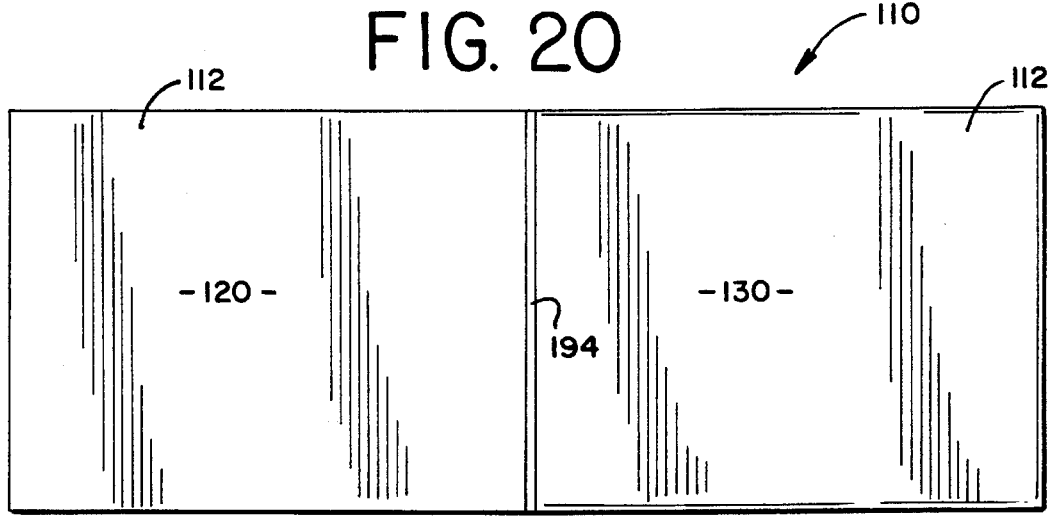
FIG. 20 is a rear elevation view of the package of FIGS. 13–19 in the open position.
Figure 22:
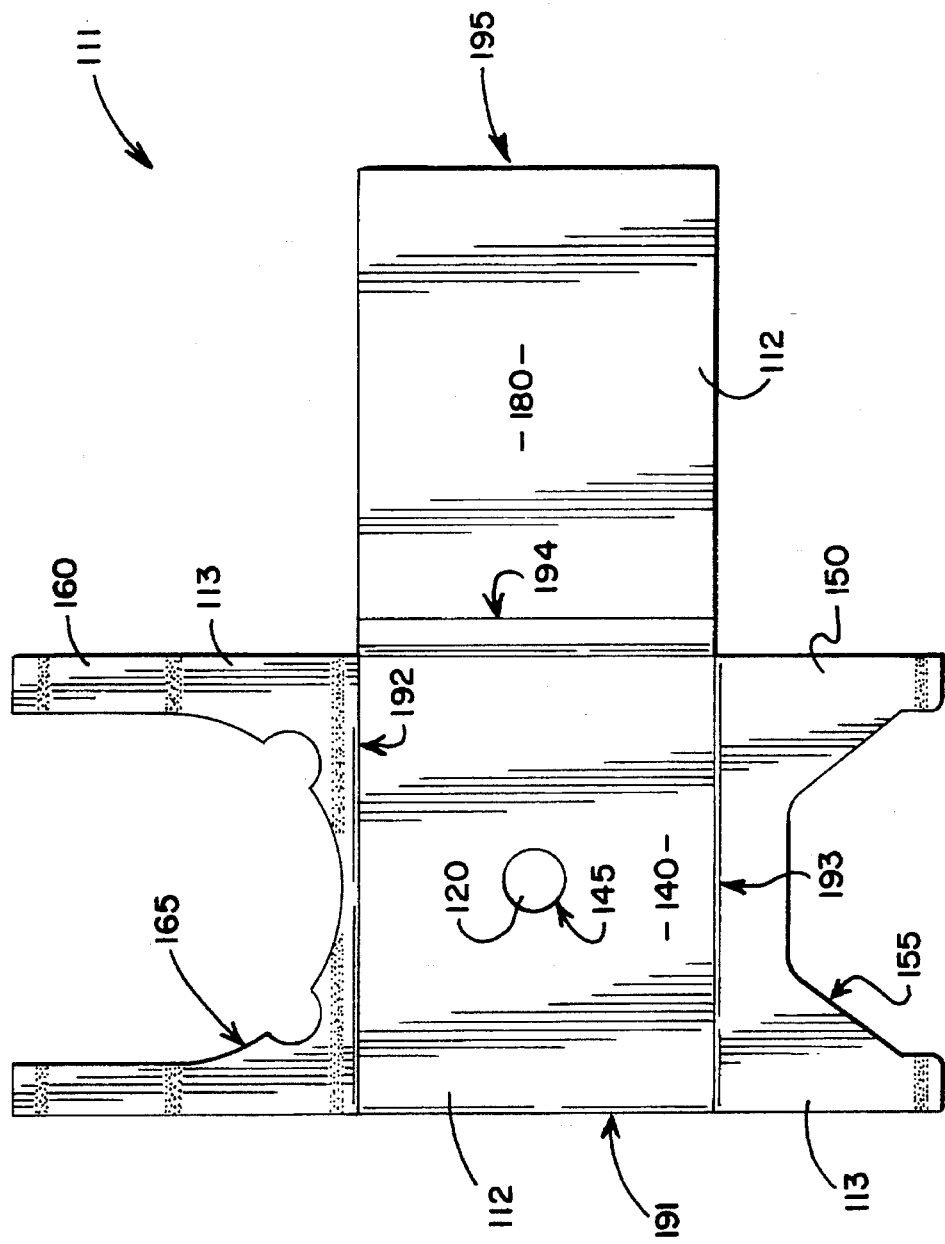
FIG. 22 is a top plan view of the blank construction of FIG. 21 after a first and second fold to the blank.
Figure 22:
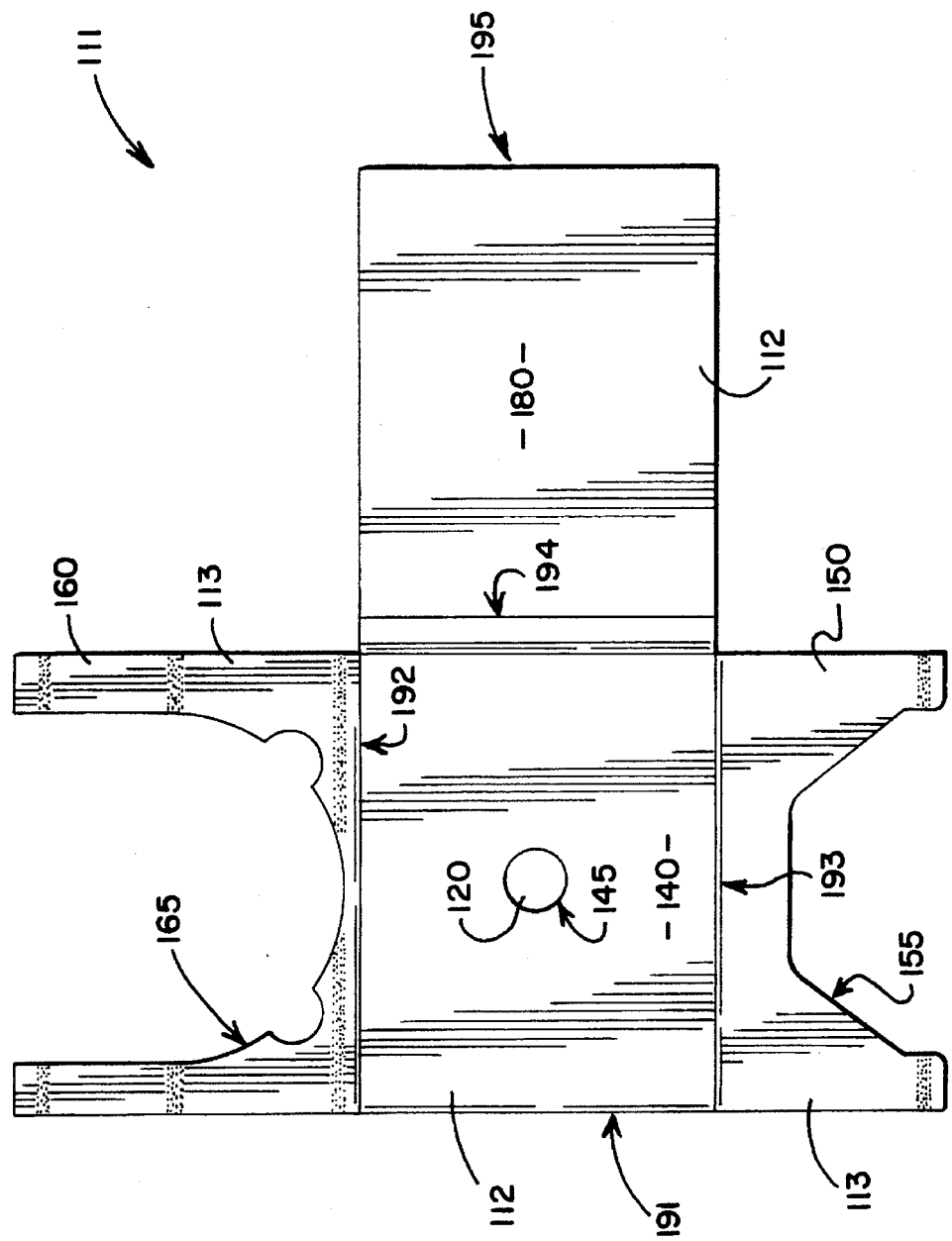
Figure 23:
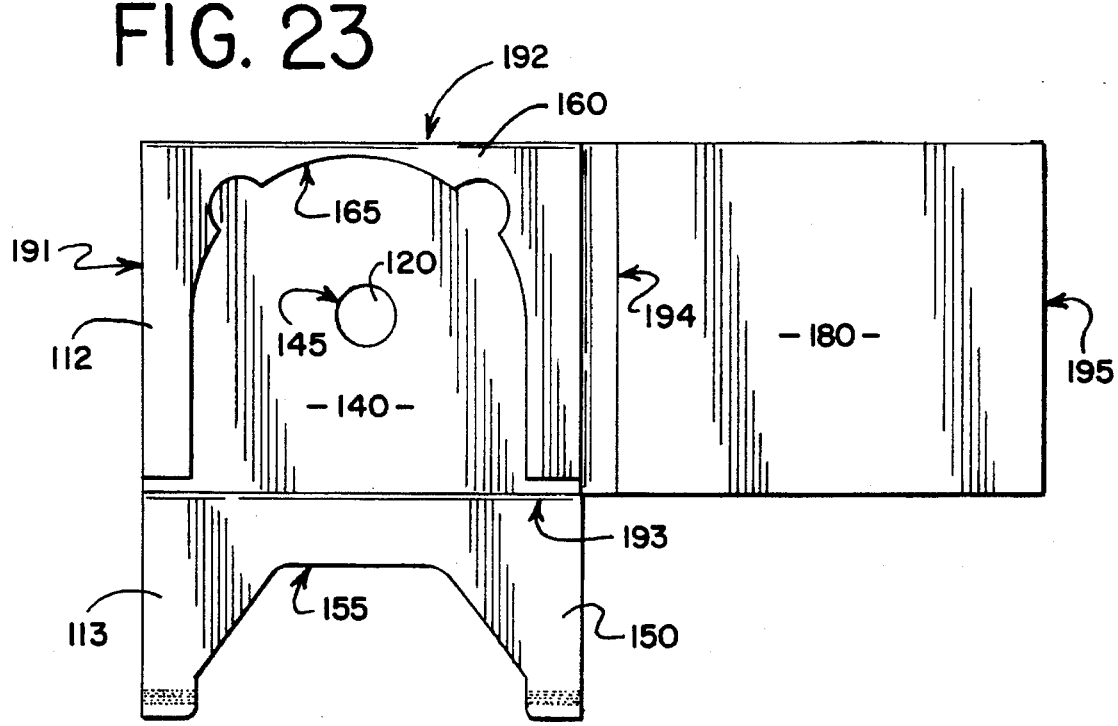
FIG. 23 is a top plan view of the blank construction of FIGS. 21 and 23 after a third fold to the blank.
Figure 24:
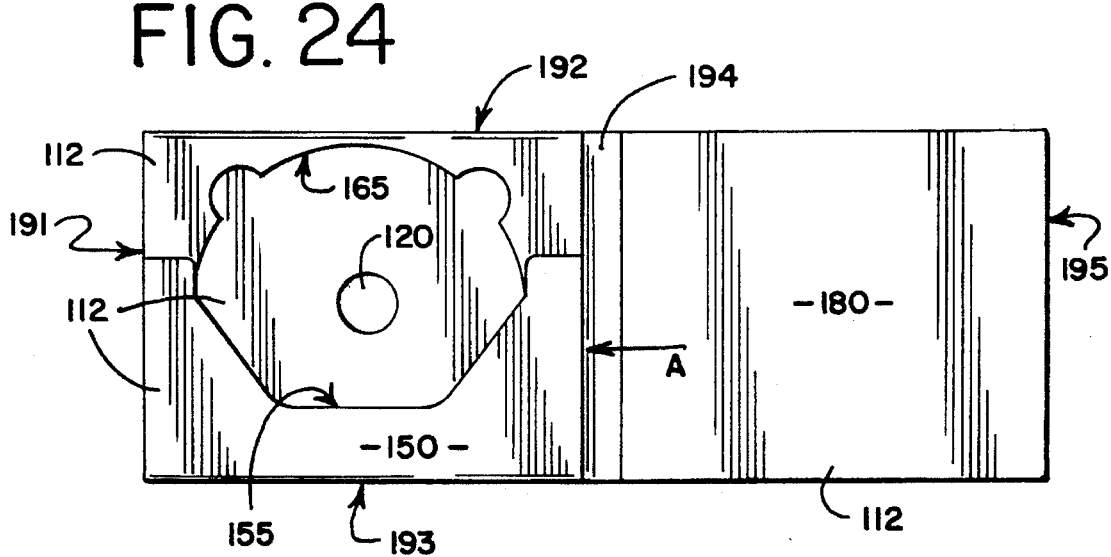
FIG. 24 is a top plan view of the blank construction of FIGS. 21–23 after a fourth fold to the blank.
Figure 25:
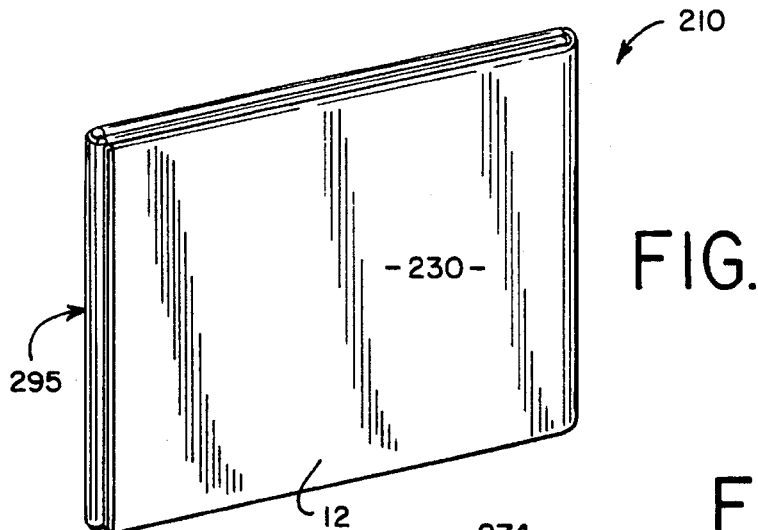
FIG. 25 is a perspective front view of a third embodiment of the package in the closed position made in accordance with the teachings of the present invention.
Figure 32:
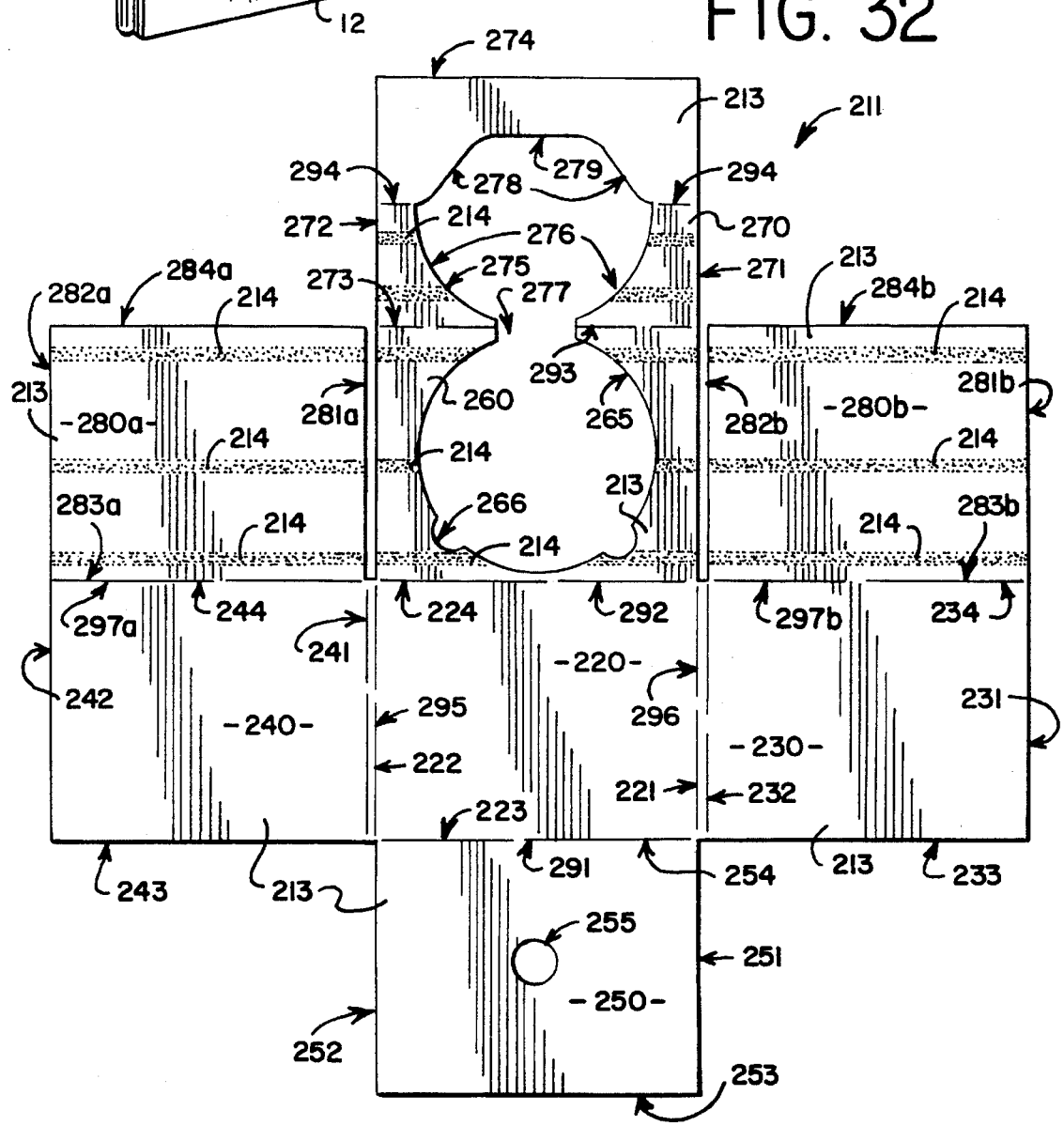
FIG. 32 is top plan view of a blank construction in the open, unfolded position used to construct the third embodiment of the package of FIGS. 25–31.
Figure 33:
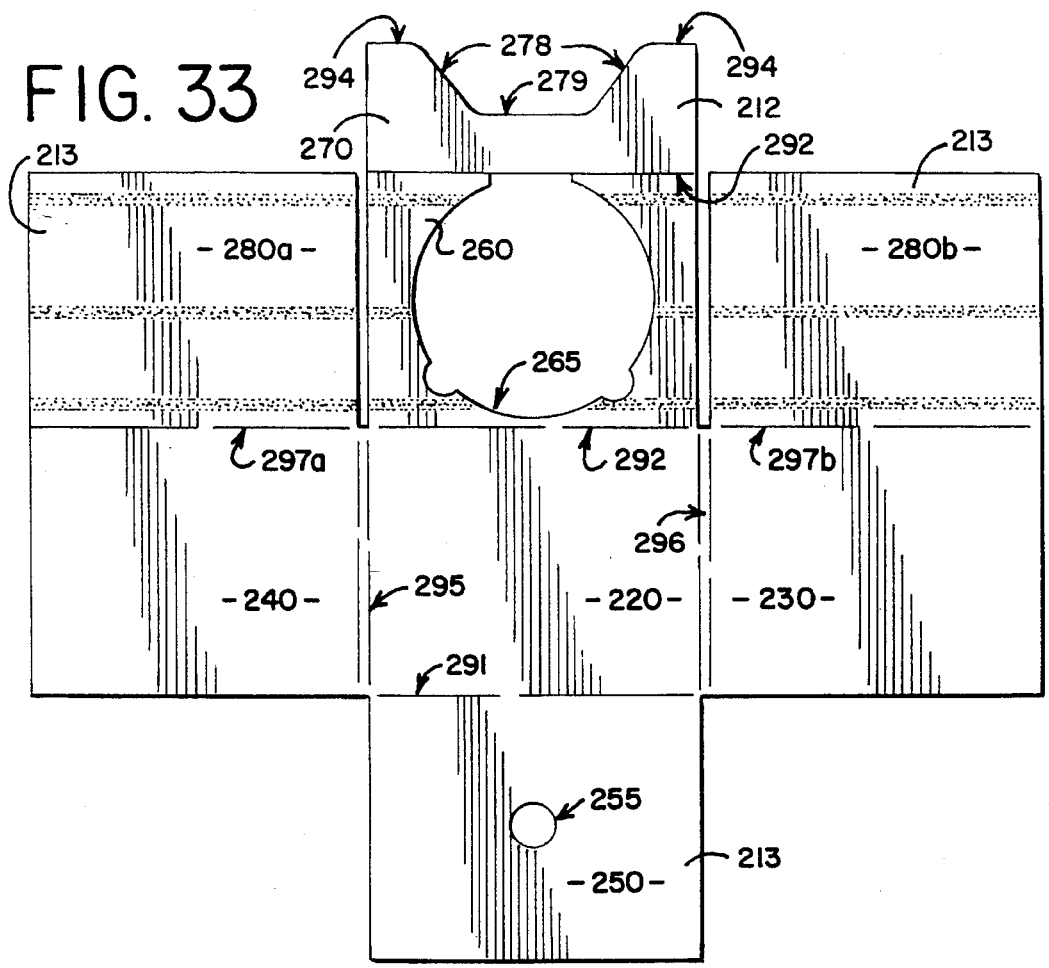
FIG. 33 is a top plan view of the blank construction of FIG. 32 after a first fold to the blank.
Figure 34:
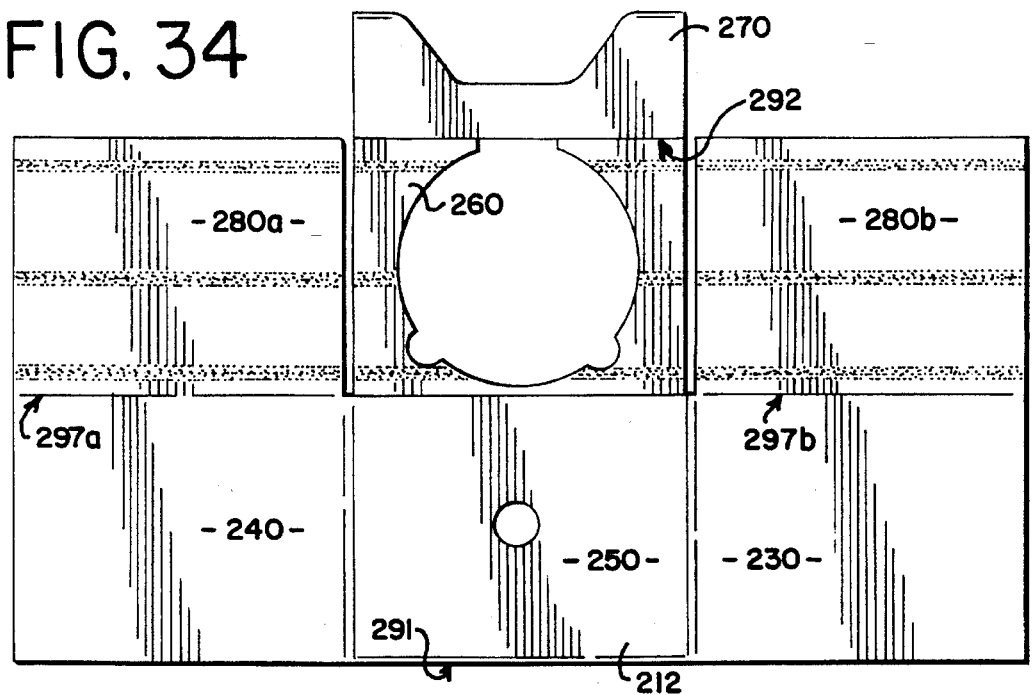
FIG. 34 is a top plan view of the blank construction of FIGS. 32 and 33 after a second fold to the blank.
Figure 35:
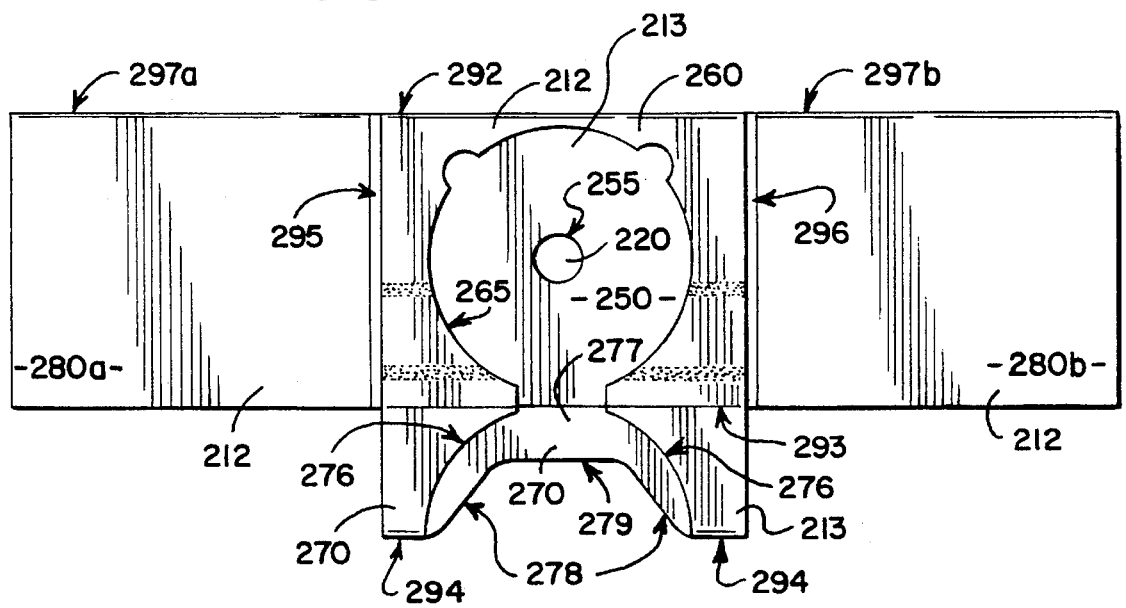
FIG. 35 is a top plan view of the blank construction of FIGS. 32–34 after a third, fourth and fifth fold to the blank; and, FIG. 36 is a top plan view of the blank construction of FIGS. 32–35 after a sixth fold to the blank.
Figure 36:
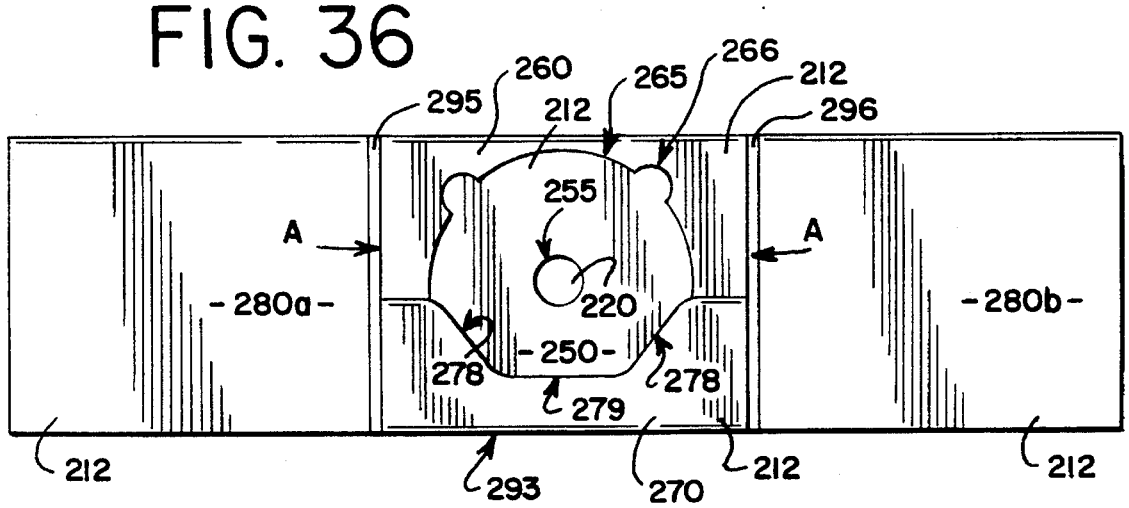

While this invention is susceptible of embodiment in many different forms, there is shown in the drawings and will herein be described in detail three preferred embodiments of the invention with the understanding that the present disclosure is to be considered as an exemplification of the principles of the invention and is not intended to limit the broad aspect of the invention to the embodiments illustrated.

As shown in FIGS. 1–12, a first embodiment of the compact disc carrier or package 10 is formed of a blank construction 11 comprised of a plurality of panels that are folded upon and adhered to one another. The blank 11 has two surfaces, that being an outer surface 12 and an inner surface 13.

Turning to FIG. 9, the central piece of the blank 11 is a substantially rectangular back panel 20 that has a pair of opposed sides 21,22 and a pair of opposed ends 23,24. Contiguous with and adjacent to the right side 21 of the back panel 20, there is a substantially rectangular right side panel 30. This right side panel 30 has a pair of opposed sides 31,32 and a pair of opposed ends 33,34. This right side panel 30 includes a centrally located opening 35 therein. The back panel 20 and the right side panel 30 are foldably joined either along or adjacent to the right side 21 of the back panel 20 and the left side 32 of the right side panel 30 by a linear first foldable joint 91.

A contiguous substantially rectangular left side panel 40 having a pair of opposed sides 41,42 and a pair of opposed ends 43,44 is positioned adjacent to the left side 22 of the back panel 20. The left side panel 40 has a large centrally located hole 45 therein that is adapted and configured to receive and position a compact disc therein. In particular, the diameter of this hole is just a little greater than 4.7 inches, which permits the edges of the compact disc to rest just next to or actually abut the arcuate edges of the hole 45. The back panel 20 and the left side panel 40 are foldably joined either along or adjacent to the left side 22 of the back panel 20 and the right side 41 of the left side panel 40 by a linear second foldable joint 92. The left side panel 40 further includes two radial, arcuate notches or holes 46 adjacent the central opening 45. These arcuate notches 46 are oriented and sized for exposing an edge of a compact disc positioned in the hole 45 and permitting one to slide a finger into the notch, contact the disc, grip, and lift the compact disc out of the hole. One may also lift or lever the disc edge to allow it to slide out. In addition, a plurality of radial creases 47 for forming puckers are constructed into the left side panel 40 adjacent the hole 45 to facilitate the gripping or levering, and consequently the placing and removing, of a compact disc in the hole 45.

Adjacent to the lower edge 23 of the back panel 20, there is a connected, contiguous bottom panel 50. This bottom panel also has a pair of opposed sides 51,52 and a pair of opposed ends 53,54. The bottom end, or edge, 53 has a cut-out 55 therein such that the panel 50 is adapted to partially cover the hole 45, and a compact disc resting in the hole, of the left side panel 40 when the blank is folded and made into a package. The cut-out 55 is formed to include diverging angular edges 56 and a horizontal edge 57. The two angular edges 56 and horizontal edge 57 form the bottom end or edge 53 of the bottom panel 50. The back panel 20 and the bottom panel 50 are foldably joined either along or adjacent to the lower end 23 of the back panel 20 and the upper end 54 of the bottom panel 50 by a linear third foldable joint 93.

A substantially rectangular top panel 60 having a pair of opposed sides 61,62 and a pair of opposed ends 63,64 is also connected to the back panel 20. This contiguous top panel 60 is positioned adjacent to the upper end 24 of the back panel 20, and the top panel 60 is foldably joined either along or adjacent to the upper end 24 of the back panel 20 and the lower end 63 of the top panel 60 by a fourth foldable joint 94.

Contiguous with and adjacent to the upper end 64 of the top panel 60, there is a substantially rectangular lap panel 70 also having a pair of opposed sides 71,72 and a pair of opposed ends 73,74. The top panel 60 and the lap panel 70 are foldably joined either along or adjacent to the upper end 64 of the top panel 60 and the lower end 73 of the top panel 70 by a fifth foldable joint 95.

A contiguous substantially rectangular flap panel 80 having a pair of opposed sides 81,82 and a pair of opposed ends 83,84 is positioned adjacent to the left side 62 of the top panel 60. The top panel 60 and the flap panel 80 are foldably joined either along or adjacent to one side 62 of the back panel 60 and the right side 81 of the flap panel 80 by a linear sixth foldable joint 96.

To accommodate the thickness of the folded panels and of a compact disc and other materials stored within the package once folded, some of the foldable joints are formed of two foldable parallel lines or double fold lines as opposed to a single fold line. Specifically, as shown in FIG. 9, the first foldable joint 91 comprises a single fold line, the second foldable joint comprises a single fold line, the third foldable joint 93 comprises two parallel fold lines, the fourth 94 foldable joint comprises two parallel fold lines, the fifth foldable joint 95 comprises two parallel lines, and the sixth foldable joint 96 comprises a single fold line. As to the fifth foldable joint 95, a tear strip 97 is constructed or attached to the panels parallel to the adjacent ends 64,73 between the double fold lines so as to form a frangible or breakable, fragile connection. Consequently, when the blank is folded into and made a package, a pull on the end of the tear strip 97 causes the tear strip to break from the rest of the package resulting in a readily accessible opening to the package.

To construct the package from the blank it is necessary to put adhesive onto the inner surface 13 of some of the panels.

Specifically, adhesive such as glue 14 is placed on the inner surface of the left side panel 40, the flap panel 80 and the bottom panel 50. Preferably, the adhesive is put down in parallel strips. In addition, parallel glue strips having some thickness are put down upon the inner surface 13 of the bottom panel. The lap panel 70 also includes a fastener 16. This fastener 16 can be an adhesive covered with release paper for a one time use or multiple uses. Or, the fastener 16 may comprise a snap, a latch or a mating strip of a hook and loop type fastener, such as VELCRO. If a mating type fastener is desired, the cooperating component is attached to the outer surface 13 of the back panel 20.

Once the blank 11 is made and adhesive placed upon it, a package 10 for storing a compact disc is easily constructed by merely folding the blank. The details of folding the blank 11 are shown in FIGS. 9–12. The right side panel 30 is folded along the first foldable joint 91 onto the back panel 20. The outer surface 12 of the right side panel 30 abuts the compact disc and acts as a buffer or spacer between the compact disc and the back panel 20. The right side panel 30 also provides additional support (i.e., to further stiffen) for and strength to the back panel 20 behind a stored compact disc. This right side panel 30 also acts as a partition for any materials stored between it and the back panel. The left side panel 40 having a centrally located hole 45 therein for receiving and positioning a compact disc in the folded package is folded along the second foldable joint 92 onto the right side panel 30 which was previously folded onto the back panel 20. An adhesive 14 ensures that the outer surface 12 of the right side panel 30 attaches to the inner surface 13 of the left side panel 40.

The bottom panel 50 is next folded along the third folding joint 93 onto the folded left side panel 40. The disc that is carried in the package is thus disposed in the opening 45 of the left side panel 40 between the right side panel 30 and the bottom panel 50, the cut-out 55 also permitting easy access to the disc. An adhesive 15 on the bottom panel 50 secures it to the left side panel 40.

The flap panel 80 is folded along the sixth foldable joint 96 and adhered to the top panel 60 by the lines of adhesive 14. The outer surface 12 of the flap panel 80 abuts the compact disc when the package is closed, and like the right side panel 30, acts as a buffer or spacer between the compact disc and the top panel 60. The top panel 60 in combination with the flap panel 80 act as a cover for the compact disc. The flap panel 80 further provides additional support for and strength to the top panel 60 in front of a stored compact disc.

As folded to this point, the package 10 is now capable of storing a compact disc in the pocket formed by the hole 45 in the left side panel 40 and between the right side panel 30 and the bottom panel 50 in the hole. Consequently, a disc positioned in the hole 45 is held against the right side panel by the portion of the bottom panel extending over and beyond the edges of the hole 45.

It is further capable of storing materials such as instructions, advertising, songbooks, etc. in a second pocket formed between the back panel 20 and the right side panel 30. Access to this second pocket can be gained through a gap between the back panel's (20) top edge 24 and the folded right panel's (30) top edge 34. (See arrow A in FIG. 12).

The opening 35 of the right side panel 30 is positioned immediately behind and aligned with the center hole of a compact disc (not shown) stored in the package. Thus, one can see through the opening 35 if materials, i.e., instructions, as behind the right side panel 30. Once the disc is slid into place, the top panel 60 connected to the back panel 20 and disposed adjacent the folded combination of the right side panel 30, left side panel 40 and bottom panel 50, can be folded (repeatably) along the fourth foldable joint 94.

For mailing or for retail display, the lap panel 70 disposed adjacent to the top panel 60 may be folded along the fifth foldable joint 95 (FIG. 5) and fastened by fastener 16 to the outer surface 12 of the back panel 20. With a single use fastener 16 (i.e., glue and release paper), the package 10 may be permanently sealed. Access to the internal contents and disc may be obtained by pulling and removing the tear strip 97 along the fifth foldable joint 95 away from the package 10. With a multi-use fastener 16, such as VELCRO brand hook and loop mating strips, snaps, etc., the package may be repeatably opened and closed.

The panels are not of equal size, rather they are sized so they may nest upon and within another once folded. For example, the right side panel is sized so it fits on top of the back panel and under the left side panel.

Printing and graphics may be applied through conventional means to both the inner surface 13 and outer surface 12 of the blank 11 so when the package 10 is formed and folded, it is aesthetically pleasing and attractive.

Shown in FIGS. 13–24, a second embodiment of the compact disc carrier or package 110 is also formed of a blank construction 111 comprised of a plurality of panels folded upon and adhered to one another. As shown in FIG. 21, this second blank 111 has an outer surface 112 and an inner surface 113. The blank 111 also includes a substantially rectangular back panel 120 with opposed sides 121, 122 and opposed ends 123,124. Contiguous with and adjacent to the left side 122 of the back panel 120, there is a substantially rectangular left side panel 140. This left side panel 140 also has a pair of opposed sides 141,142 and a pair of opposed ends 143,144 and a centrally located opening 145 therein. The back panel 120 and the left side panel 140 are foldably joined either along or adjacent to the left side 122 of the back panel 120 and the right side 141 of the left side panel 140 by a linear first foldable joint 191.

A contiguous, substantially rectangular top panel 160 having a pair of opposed sides 161,162 and a pair of opposed ends 163,164 is positioned adjacent to the upper end 124 of the back panel 120. This top panel 160 has a large elongated first cut-out 165 therein that is adapted and configured to receive and position a compact disc therein. As with the central hole of the first embodiment, this cut-out 165 has a portion that is arcuate in shape, having a diameter slightly larger than 4.7 inches. The outer edges of a compact disc laying flat within this cut-out, touch or are just adjacent the edges of the cut-out 165. The back panel 120 and the top panel 160 are foldably joined either along or adjacent to the upper end 124 of the back panel 120 and the lower end 163 of the top panel 160 by a linear second foldable joint 192. The top panel 160 further includes two radial, arcuate notches or holes 166 adjacent the elongated cut-out 165. As the first embodiment, these arcuate notches or holes 166 are oriented and sized for exposing an edge of a compact disc positioned in the space provided by the elongated cut-out 165 for permitting one to slide a finger into the notches and grip or lever the compact disc. For example, one can put one's thumb into the center hole of the compact disc (not shown) and the index finger into a notch, squeeze the disc and lift it out of the package. Further, one may merely slide a finger into the notch and leverage the disc upwardly in a direction away from the back panel, turn the package upside down so the notches face down, and let the disc slide out of the package. The elongated first cut-out 165 is formed of two substantially vertical edges 167, each having an arcuate edge portion 168, and an arcuate horizontal edge portion 169. It is the arcuate portion 168 of the vertical edges 167 and the arcuate horizontal edge portion 169 that position and hold the compact disc in the carrier.

Adjacent to the lower end 123 of the back panel 120, there is a connected, contiguous bottom panel 150. This bottom panel also has a pair of opposed sides 151,152 and a pair of opposed ends 153,154. The bottom end 153 has a second cut-out 155 therein and is adapted to partially cover the first cut-out 165 of the top panel 160 when the blank is folded and made into a package. Thus, a pocket is formed between the bottom panel 150 and the left side panel 140 in which the disc, positioned in the first cut-out 165, sits. The second cut-out 155 allows access to the disc positioned in the first cut-out 165. The second cut-out is formed of two diverging angular edges 156 and a horizontal edge 157. The two angular edges 156 and horizontal edge 157 form the bottom end 153 of the bottom panel 150. The back panel 120 and the bottom panel 150 are foldably joined either along or adjacent to the lower end 123 of the back panel 120 and the upper end 154 of the bottom panel 150 by a linear third foldable joint 193.

A substantially rectangular right side panel 130 having a pair of opposed sides 131,132 and a pair of opposed ends 133,134 is also connected to the back panel 120. This right side panel 130 is positioned adjacent to the right side 121 of the back panel 120, and is foldably joined either along or adjacent to the right side of the back panel and the left side 132 of the left side panel by a fourth foldable joint 194.

Contiguous with and adjacent to the right side 131 or the right side panel 130, there is a substantially rectangular flap panel 180 having a pair of opposed sides 181,182 and a pair of opposed ends 183,184. The right side panel 130 and the flap panel 180 are foldably joined either along or adjacent to the right side of the right side panel and the left side of the flap panel by a fifth foldable joint 195.

Again, to accommodate the thickness of the folded panels and of a compact disc and materials, such as a pamphlet, stored within the package once folded, some of the foldable joints are formed of two foldable parallel lines or double fold lines. Specifically, the first foldable joint 91, second foldable joint 192, third foldable joint 193 and fifth foldable joint 195 comprise a single fold line and the fourth foldable joint 194 (FIG. 22) comprises two parallel fold lines.

As with the first embodiment, to construct the package from the blank it is necessary to put adhesive onto the inner surface 113 of some of the panels. Specifically, adhesive 114 is placed on the inner surfaces of the top panel 160, the bottom panel 150 and the right side panel 130 or flap panel 180. Preferably, the adhesive is put down in parallel strips.

The details for folding the blank 111 are shown in FIGS. 21–24. A package 110 for storing a compact disc and other materials is constructed by folding the left side panel 140 along the first foldable joint 191 onto the back panel 120. The top panel 160, having the elongated first cut-out 165 therein, is folded along the second foldable joint 192 onto the previously folded left side panel 140. Adhesive 114 ensures that the outer surface 112 of the left side panel 140 attaches to the inner surface 113 of the top panel 160. The bottom panel 150 is next folded along the third folding joint 193 onto the folded top panel 160. The disc carried in the package is disposed in the opening formed by the first cut-out of the top panel between the left side panel and the bottom panel, the second cut-out permitting easy access to the disc. Adhesive 114 on the bottom panel secures it to the folded top panel. The flap panel 180 is folded along the fifth fold line 195 and adhered to the right side panel 130 by the lines of adhesive 114. The outer surface 112 of the flap panel 180 abuts the compact disc and acts as a buffer or spacer between the compact disc and the right side panel 130. The right side panel in combination with the flap panel act as a cover for the compact disc.

As folded, the package 110 is capable of storing a compact disc in a first pocket formed by the first cut-out in the top panel and between the left side panel and the bottom panel. A second pocket for holding materials is also formed between the back panel 120 and left side panel 140. Access to this second pocket is possible through the opening between the right side 121 of the back panel 120 and the left side 142 of the folded left side panel 140. (See arrow A in FIG. 24). One can see materials stored in this second pocket through the opening 145 in the left side panel, even if a disc is positioned in the first pocket. Once the disc and the instructions are slid into place, the flap panel connected to the right side panel and disposed adjacent the folded combination of the back panel, the left side panel, and the top and bottom panels, can be folded (repeatably) along the fourth foldable joint 194.

For mailing or for retail display, as with the first embodiment, a lap panel (not shown) may be connected to the blank 111. As before, printing and graphics may be applied to both the inner surface 113 and outer surface 112 of the blank 111.

In FIGS. 25–36, a third embodiment of the compact disc carrier or package 210 is formed of a blank construction 211 comprised of a plurality of panels folded upon and adhered to one another. As with the prior two embodiments, the third blank 211 has an outer surface 212 and an inner surface 213.

There are eight panels. Shown in FIG. 32, there is a back panel 220, a bottom panel 250, a first top panel 260, a second top panel 270, a right side panel 230, a left side panel 240 and two flap panels 280a,280b, with each panel having a pair of opposed sides and opposed ends (back panel—221,222, 223,224; bottom panel—251,252,253,254; first top panel—261,262,263,264; second top panel—271,272,273,274; right side panel—231, 232,233,234; left side panel—241,242, 243,244; first flap panel—281a,282a, 283a,284a; and, second flap panel—281b, 282b,283b,284b). All of the panels are substantially rectangular.

The bottom panel 250 includes a centrally located opening 255 therein for noting any materials such as advertising or instructions, stored behind this bottom panel, that is, when the blank is folded, aligned with center hole of a compact disc (not shown) stored within the package. The bottom panel and the back panel 220 are foldably joined either along or adjacent to the lower end 223 of the back panel 220 and the upper end 254 of the bottom panel by a linear first foldable joint 291. The first top panel 260 has a large centrally located substantially circular or arcuate first cut-out 265 therein that is adapted and configured like the cut-outs of the first two embodiments, to receive and position a compact disc therein. The back panel 220 and the first top panel 260 are foldably joined to one another either along or adjacent to the upper end 224 of the back panel 220 and the lower end 263 of the first top panel 260 by a substantially linear second foldable joint 292. There are two radial arcuate notches or holes 266 adjacent the central first cut-out 265 that are oriented and sized for exposing an edge of a compact disc positioned in the first cut-out and for permitting one to slide a finger into the notch and grip or lever and slide the compact disc.

Adjacent to the upper end 264 of the first top panel 260, there is a connected, contiguous second top panel 270. This second top panel also has a centrally located second cut-out 275 therein and an intermediate foldable joint, designated as a fourth foldable joint 294. The first top panel 260 and the second top panel 270 are foldably joined either along or adjacent to the upper end 264 of the first top panel 260 and the lower end 273 of the second top panel 270 by a linear third foldable joint 293. The fourth foldable joint 294 is substantially parallel to the third foldable joint 293 and separates the second top panel 270 into two portions. The lower portion of the second top panel 270, between the third and fourth foldable joints, is cut out (275) so as to have two converging arcuate edges 276 that terminate into an opening 277 that opens to the first cut-out 265 of the first top panel 260. The arcuate edges 276 of this cut-out 275 are sized to align with the arcuate edge of the first cut-out 265 when the second top section 270 is folded upon the first top section 260 along the third foldable joint 293. The upper portion of the second top panel 270, between the upper end 274 and fourth foldable joint 294, is cut-out to include two diverging vertical edges 278 and a horizontal edge 279. Thus, when the second top panel is folded along the intermediate, fourth foldable joint upon itself and the first top panel is folded along the third foldable joint onto the back or bottom panel, the upper portion of the second top member partially covers the first cut-out. In short, the second cut-out 275, once folded, partially covers the first cut-out 265 when the blank is folded and made into a package.

Adjacent each side of the back panel 220, there are contiguous substantially rectangular side panels 240,230. Each side panel 240,230 is foldably joined either along or adjacent to a side 222,221 of the back panel 220 and a side 241,232 of the side panel 240,230 by a fifth foldable joint 295 or a sixth foldable joint 296, respectively.

Each side panel 230,240, further is connected to a contiguous substantially rectangular flap panel 280a,280b. Each side panel 230,240 and a flap panel 280a,280b are foldably joined either along or adjacent to one end 244,234 of the side panel 230,240 and one end 283a,283b of the flap panel 280a,280b by a linear foldable joint (designated seventh foldable joints 297a,297b).

To accommodate the thickness of the folded panels and of a compact disc and any flat materials stored within the package once folded, some of the foldable joints are formed of two foldable parallel lines or double fold lines. Specifically, the first foldable joint 291, the second foldable joint 292, the third foldable joint 293, the fourth foldable joint 294, and the two seventh foldable joints 297a,297b comprise a single fold line, and the fifth foldable joint 295 and the sixth foldable joint 296 comprise two parallel fold lines.

To construct the package from the blank, it is necessary to put adhesive onto the inner surface 213 and outer surface 212 of some of the panels. Specifically, a glue 214 is placed on the inner surfaces 213 of two flap panels 280a,280b, the first top panel 260 and the lower portion of the second top panel 270 and on the outer surface 212 of the lower portion of the second top panel 270. Preferably, as shown, the adhesive is put down in parallel strips.

Once the blank 211 is made and adhesive placed upon it, a package 210 for storing a compact disc and other materials is easily constructed by merely folding the blank. The details of folding the blank 211 are shown in FIGS. 32–36. The bottom panel 250 is folded along the first foldable joint 291 onto the back panel 220. As with the two prior embodiments, the outer surface 212 of the intermediate panel, here the bottom panel 250, abuts the compact disc and acts as a buffer or spacer between the compact disc and the back panel 220. The bottom panel also provides additional support for the back panel behind a stored compact disc. Moreover, as with the prior two embodiments, this first folded panel (here, the bottom panel 250) acts as a partition for material stored in the pocket formed between the back panel 220 and first folded panel 250, and the disc.

The first top panel 260 having the centrally located first cut-out 265 therein for receiving and positioning a compact disc in the folded package is folded along the second foldable joint 292 onto the bottom panel 250 which was previously folded onto back panel 220. The second top panel 270 is next folded along the third folding joint 293 onto the folded first top panel 260. And, the upper portion of the second top panel 270 is folded back onto itself, that being the lower portion of the second top panel, along the fourth foldable joint 294. The disc carried in this third embodiment package is disposed in the first cut-out 265 of the first top panel 260, between the bottom panel 250 and the upper portion of the second top panel 270, the second cut-out 275 permitting easy access thereto. The lower portion of the second top panel 270 is disposed between and acts as a spacer to the first top panel 260 and the lower portion of the second top panel 270. An adhesive secures the two panels 260,270 in this position.

Each flap panel 280a,280b is folded along the seventh foldable joint 297a,297b and adhered to a side panel 240, 230 by adhesive 14. Either side panel 240,230 can then be folded (repeatably) along either the fifth foldable joint 295 or sixth foldable joint 296 onto the combination of the folded back panel 220, bottom panel 250 and top panels 260,270 and the other side panel 230,240 folded thereon. The outer surface 212 of one of the flap panels 280a,280b abuts the compact disc and acts as a buffer or spacer between the compact disc and the side panel 240,230. The flap panels and side panels in combination act as a strong cover for the compact disc. The flap panels further provide additional support for the side panels in front of a stored compact disc.

As folded, the package 210 is capable of storing a compact disc in the pocket formed by the first cut-out 265 in the first top panel 260 and the second cut-out 275 in the lower portion of the second top panel 270 between the bottom panel 250 and the upper portion of the second cut-out 275. Again, a second pocket for holding materials is formed between the back panel 220 and the bottom panel 250 (first folded panel). Easy access to materials stored in the second pocket can be gained one of two ways, either through the opening between the left side edge 222 of the back panel 220 and the left side edge 252 of the folded bottom panel 250 or the opening between the right side edge 221 of the back panel 220 and the right side edge 251 of the folded bottom panel 250. (See arrows A in FIG. 36). The materials can be visible through the opening 255 in this bottom panel 250. Once the disc and any materials are slid into place, the side panels 230,240 connected to the back panel 220 and disposed adjacent the folded combination of the back panel 220, the bottom panel 250, and the two top panels 260,270, can be folded (repeatably) along the fifth and sixth foldable joints 295,296.

The panels are not of equal sizing; they are sized so they nest upon and within another. For example, the bottom panel is sized so it fits over the back panel and under the folded top panels and between the two side panels. As before, printing and graphics may be applied through conventional means to both the inner and outer surfaces of the blank 11 so when the package is formed and folded, it is aesthetically pleasing and attractive.

In constructing the above described blanks and packages, it has been found that paperboard is the best material to use. Paperboards such as the following are acceptable paperboards: Clay Coated News Back, Solid Bleach Sulphate, Double White Chip Board, Bending Chip, Thermo Mechanically Pulped (TMP), recognizable by those skilled in the art, have been found to be suitable materials. The preferable paperboard used has a thickness in the range of 0.008 inches to 0.045 inches. Adhesives and fastening materials include the following: hot melt glue, tape, tuck tabs, Velcro brand type closures, snaps, straps, bands, latex glue and resin glue.

In practice, it has been found that one can coat the outside surface (12,112,212) of the blanks (11,111,211) with a clay coating, a laminate, a polycoating, a tyvek coating or any other coating. If desired, one need only put graphics and other indicia on the outside surface (12,112,212). Once folded, the outside or outer surface is the only surface visible; it is also the surface that the disc is sandwiched between. The non-coated and non-laminated surface (13, 113,213) remains the fibrous surface and is really not visible. The second pocket for stored materials has fibrous, non-treated walls.

As a result, there is no need to treat the inner or inside surface (13,113,213) of the blanks with a coating or laminate, or to put writing or indicia thereon. This can save a lot of money in the manufacturing and constructing of the packages of the present invention.

While the specific embodiments have been illustrated and described, numerous modifications come to mind without significantly departing from the spirit of the invention, and the scope of protection is only limited by the scope of the accompanying Claims.

I claim:

1. A blank construction for making a compact disc package comprising:

a back panel;

an integral first panel having a first arcuate cut-out adapted to receive and hold a compact disc therein and foldable onto said back panel along a first foldable joint; and, an integral second panel having a second cut-out therein extending inwardly from an outer edge thereof and adapted to partially cover said first cut-out and foldable onto said first panel and back panel along a second foldable joint.

2. The blank construction of claim 1 further including an integral third panel foldable directly onto said back panel along a third foldable joint.

3. The blank construction of claim 2 further including an integral fourth panel foldable onto said folded first panel, second panel, third panel and back panel along a fourth foldable joint.

4. The blank construction of claim 3 further including an integral flap panel foldable onto said fourth panel along a fifth foldable joint.

5. The blank construction of claim 2 wherein said third panel further includes a centrally positioned opening therein.

6. The blank construction of claim 5 wherein said first panel, second panel, third panel and fourth panel are substantially rectangular.

7. The blank construction of claim 2 wherein said first panel includes at least one notch adjacent said first cut-out adapted for exposing an edge of a compact disc positioned in said first cut-out and adjacent said third panel folded onto said back panel.

8. The blank construction of claim 7 wherein said first panel further includes at least one crease therein adjacent said first cut-out for forming a pucker in said first panel.

9. A package for storing a compact disc package comprising:

a back panel;

an integral first panel having a centrally located first cut-out therein for receiving and positioning a compact disc therein against said back panel folded onto said back panel along a first foldable joint formed between said first panel and said back panel; and, an integral second panel having a second cut-out therein and adapted to partially cover said first cut-out folded onto said folded first panel and back panel along a second foldable joint.

10. The package of claim 9 further including an integral third panel disposed adjacent to said back panel along a third foldable joint formed between said third panel and said back panel.

11. The package of claim 9 further including an integral fourth panel adapted to be foldable onto said folded first panel, second panel, third panel and back panel along a fourth foldable joint formed between said fourth panel and said back panel.

12. The package of claim 11 further including an integral flap panel foldable onto said fourth panel along a fifth foldable joint.

13. The package of claim 11 wherein said third panel further includes a centrally positioned opening therein and said first panel, second panel, third panel and fourth panel are substantially rectangular.

14. The package of claim 9 wherein said first panel and said second panel include adhesive on a surface thereof.

15. The package of claim 9 wherein said first panel includes at least one notch adjacent said first cut-out adapted for exposing an edge of a compact disc positioned in said first cut-out and adjacent said back panel.

16. The package of claim 15 wherein said first panel further includes at least one crease therein adjacent said first cut-out for forming a pucker in said first panel.

17. A blank construction for making a compact disc package comprising:

a back panel having a pair of opposed sides and a pair of opposed ends;

a first side panel having a pair of opposed sides and having a hole therein adapted to receive and position a compact disc therein and with one said opposed side being contiguous with one said opposed side of said back panel, said back panel and said first side panel being joined by a first foldable joint;

a first end panel having a pair of opposed ends and a cut-out therein and adapted to partially cover said hole and with one said opposed end contiguous with one said opposed end of said back panel, said back panel and said first end panel being joined by a second foldable joint; and, a second end panel having a pair of opposed ends with one said opposed end contiguous with said other opposed end of said back panel, said back panel and said second end panel being joined by a third foldable joint.

18. The blank construction of claim 17 further including a second side panel having a pair of opposed sides with one said opposed side being contiguous with said other opposed side of said back panel, said back panel and said second side panel being joined by a fourth foldable joint, and a flap panel having two pairs of opposed edges with one said opposed edge contiguous with a side or end of said second end panel, said flap panel and said second end panel being joined by a sixth foldable joint.

19. The blank construction of claim 18 wherein said second side panel further includes a centrally located opening therein.

20. The blank construction of claim 17 wherein said first side panel includes at least one notch adjacent said hole adapted for exposing an edge of a compact disc positioned in said hole and adjacent said second side panel.

21. The blank construction of claim 20 wherein said first side panel further includes at least one crease therein adjacent said hole for forming a pucker in said second side panel.

22. The blank construction of claim 21 further including a lap panel having opposed ends with one said opposed end contiguous with said other opposed end of said second end panel, said lap panel and said second end panel being joined by a fifth foldable joint.

23. The blank construction of claim 22 wherein said fourth foldable joint, said first foldable joint and said sixth foldable joint comprise a single fold line, said second foldable joint, and said third foldable joint and said fifth foldable joint comprise two parallel fold lines, and said fifth foldable joint comprises two parallel lines with a frangible connection disposed therebetween.

24. A blank construction for making a compact disc package comprising:

a back panel having a pair of opposed sides and a pair of opposed ends;

a first side panel having a pair of opposed sides with one said opposed side being connected to one said side of said back panel by a first foldable joint;

a second side panel having a pair of opposed sides and having a hole therein adapted to receive and position a compact disc therein and with one said opposed side being connected to said other opposed side of said back panel by a second foldable joint;

a first end panel having a pair of opposed ends and a cut-out therein and adapted to partially cover said hole and with one said opposed end being connected to one said opposed end of said back panel by a third foldable joint; and, a second end panel having a pair of opposed ends with one said opposed end being connected to said other opposed end of said back panel by a fourth foldable joint.

25. The blank construction of claim 24 wherein said back panel, said first side panel, said second side panel and said second end panel are substantially rectangular.

26. The blank construction of claim 24 further including a lap panel having two pairs of opposed edges with one said opposed edge being connected to one said side or end of said second end panel by a fifth foldable joint.

27. The blank construction of claim 26 further including a flap panel having opposed sides with one said opposed side being connected to a side of said second end panel by a sixth foldable joint.

28. The blank construction of claim 26 wherein said first side panel further includes a centrally located opening therein and said second side panel includes at least one notch adjacent said hole adapted for exposing an edge of a compact disc positioned in said hole and adjacent said first side panel and includes at least one crease therein adjacent said hole for forming a pucker in said second side panel.

29. The blank construction of claim 28 wherein said first foldable joint comprises a single fold line, said second foldable joint comprises a single fold line, said third foldable joint comprises two parallel fold lines, said fourth foldable joint comprises two parallel fold lines, said fifth foldable joint comprises two parallel lines with a frangible connection disposed therebetween and said sixth foldable joint comprises a single foldable line.

30. A package for storing a compact disc package comprising:

a back panel having a pair of opposed sides and a pair of opposed ends;

a first side panel disposed adjacent to one said opposed Side of said back panel and adapted to be foldable onto said back panel along a first foldable joint formed between said first side panel and said back panel;

a second side panel having a hole therein for receiving and positioning a compact disc therein and disposed adjacent to said other opposed side of said back panel and further adapted to be foldable onto said folded first side panel along a second foldable joint formed between said second side panel and said back panel;

a first end panel having a cut-out therein and adapted to partially cover said hole in said second side panel and disposed adjacent to one said opposed end of said back panel and further adapted to be foldable onto said folded second panel along a third foldable joint formed between said first end panel and said back panel; and, a second end panel disposed adjacent to said other opposed end of said back panel adapted to be foldable onto said folded first end panel along a fourth foldable joint formed between said second end panel and said back panel.

31. The package of claim 30 wherein said back panel, said first side panel, said second side panel and said second side panel are substantially rectangular.

32. The package of claim 31 further including a lap panel disposed adjacent to said other opposed end of said top panel adapted to be foldable onto said back panel along a fifth foldable joint.

33. The package of claim 32 further including a flap panel disposed adjacent to a side of said second side panel and adapted to be foldable onto said second side panel along a sixth foldable joint.

34. The package of claim 33 wherein said first side panel further includes a centrally located opening therein and said second side panel includes at least one notch adjacent said hole adapted for exposing an edge of a compact disc positioned in said hole and adjacent said first side panel folded onto said back panel and at least one crease therein adjacent said hole for forming a pucker in said second side panel.

35. The package of claim 34 wherein said first foldable joint comprises a single fold line, said second foldable joint comprises a single fold line, said third foldable joint comprises two parallel fold lines, said fourth foldable joint comprises two parallel fold lines, said fifth foldable joint comprises two parallel lines with a frangible connection disposed therebetween and said sixth foldable joint comprises a single foldable line.

36. The package of claim 35 wherein said first end panel includes adhesive thereon for adhering said first end panel to said second side panel, said flap panel includes adhesive thereon for adhering said flap panel to said second end panel and said lap panel includes adhesive thereon for adhering said lap panel to said back panel.

37. A blank construction for making a compact disc package comprising:

a back panel having a pair of opposed sides and a pair of opposed ends;

a first end panel having a pair of opposed ends and having an elongated first cut-out therein adapted to receive and position a compact disc therein and with one said opposed end being contiguous with one said opposed end of said back panel, said back panel and said first end panel being joined by a first foldable joint;

a second end panel having a pair of opposed ends and a second cut-out therein and adapted to partially cover said elongated first cut-out with one said opposed end contiguous with said other opposed end of said back panel, said back panel and said second end panel being joined by a second foldable joint; and, a first side panel having a pair of opposed sides with one said opposed side contiguous with one said opposed side of said back panel, said back panel and said first side panel being joined by a third foldable joint.

38. The blank construction of claim 37 further including a second side panel having a pair of opposed sides with one said opposed side being contiguous with said other opposed side of said back panel, said back panel and said second side panel being joined by a fourth foldable joint, and a flap panel having two pairs of opposed edges with one said opposed edge contiguous with either an end or an opposed side of said first side panel, said flap panel and said first side panel being joined by a fifth foldable joint.

39. The blank construction of claim 38 wherein said second side panel further includes a centrally located opening therein.

40. The blank construction of claim 38 wherein said first end panel includes at least one notch adjacent said elongated first cut-out adapted for exposing an edge of a compact disc positioned in said first cut-out and adjacent said second side panel.

41. The blank construction of claim 40 wherein said fourth foldable joint comprises a single fold line, said first foldable joint comprises a single fold line, said second foldable joint comprises a single fold line, said third foldable joint comprises two parallel fold lines, and said fifth foldable joint comprises a single foldable line.

42. A blank construction for making a compact disc package comprising:

a back panel having a pair of opposed sides and a pair of opposed ends;

a first side panel having a pair of opposed sides with one said opposed side being connected to one said side of said back panel by a first foldable joint;

a first end panel having a pair of opposed ends and having an elongated first cut-out therein adapted to receive and position a compact disc therein and with one said opposed end being connected to one said opposed end of said back panel by a second foldable joint;

a second end panel having a pair of opposed ends and a second cut-out therein and adapted to partially cover said elongated first cut-out in said first end panel and with one said opposed end connected to said other opposed end of said back panel by a third foldable joint; and, a second side panel having a pair of opposed sides with one said opposed side being connected to said other opposed side of said back panel by a fourth foldable joint.

43. The blank construction of claim 42 wherein said back panel, said second side panel, and said first side panel are substantially rectangular.

44. The blank construction of claim 43 further including a flap panel having two pairs of opposed edges with one said opposed edge being connected to either one of said side or edge of said second side panel by a fifth foldable joint.

45. The blank construction of claim 44 wherein said first side panel further includes a centrally located opening therein and said second end panel includes at least one notch adjacent said elongated first cut-out adapted for exposing an edge of a compact disc positioned in said first cut-out and adjacent said first side panel.

46. The blank construction of claim 45 wherein said first foldable joint comprises a single fold line, said second foldable joint comprises a single fold line, said third foldable joint comprises a single fold line, said fourth foldable joint comprises two parallel fold lines, and said fifth foldable joint comprises a single foldable line.

47. A package for storing a compact disc package comprising:

a back panel having a pair of opposed sides and a pair of opposed ends;

a first side panel disposed adjacent to one said opposed side of said back panel and adapted to be foldable onto said back panel along a first foldable joint formed between said first side panel and said back panel;

a first end panel having a first elongated cut-out therein for receiving and positioning a compact disc therein and disposed adjacent to one said opposed end of said back panel and further adapted to be foldable onto said folded first side panel along a second foldable joint formed between said first end panel and said back panel; and, a second end panel having a second cut-out therein and adapted to partially cover said elongated first cut-out in said first end panel and disposed adjacent to said other opposed end of said back panel and further adapted to be foldable onto said folded first end panel along a third foldable joint formed between said second end panel and said back panel;

a second side panel disposed adjacent to said other opposed side of said back panel adapted to be foldable onto said folded second panel along a fourth foldable joint formed between said second side panel and said back panel.

48. The package of claim 47 wherein said back panel, said first side panel and said second side panel are substantially rectangular.

49. The package of claim 48 further including a flap panel disposed adjacent to a side or an end of said second side panel and adapted to be foldable onto said second side panel along a fifth foldable joint.

50. The package of claim 49 wherein said first side panel further includes a centrally located opening therein and said first end panel includes at least one notch adjacent said first cut-out adapted for exposing an edge of a compact disc positioned in said first cut-out and adjacent said first side panel folded onto said back panel.

51. The blank construction of claim 50 wherein said first foldable joint comprises a single fold line, said second foldable joint comprises a single fold line, said third foldable joint comprises a single fold line, said fourth foldable joint comprises two parallel fold lines, and said fifth foldable joint comprises a single foldable line.

52. The package of claim 51 wherein said first end panel includes adhesive thereon for adhering said first end panel to said first side panel, said second end panel includes adhesive thereon for adhering said second end panel to said first end panel and said flap panel includes adhesive thereon for adhering said flap panel to said second side panel.

53. A blank construction for making a compact disc package comprising:

a back panel having a pair of opposed sides and a pair of opposed ends;

a first end panel having a pair of opposed ends and having a substantially circular first cut-out therein and adapted to receive and position a compact disc therein and with one said opposed end being contiguous with one said opposed end of said back panel, said back panel and said first end panel being joined by a first foldable joint;

a second end panel having a pair of opposed ends and a second cut-out therein and adapted to be foldable along a third foldable joint to partially cover said first cut-out and with one said opposed end contiguous with said other opposed end of said first end panel, said second cut-out extending inwardly from said third foldable joint, said second end panel and said first end panel being joined by a second foldable joint; and, a side panel having a pair of opposed sides with one said opposed side contiguous with one said opposed side of said back panel, said back panel and said side panel being joined by a fourth foldable joint.

54. The blank construction of claim 53 further including a second side panel having opposed sides with one said opposed side being connected to said other opposed side of said back panel by a fifth foldable joint.

55. The blank construction of claim 54 further including a third end panel having a pair of opposed ends with one said opposed end being contiguous with said other opposed end of said back panel, said back panel and said second end panel being joined by a sixth foldable joint and at least one flap panel having two pairs of opposed edges with one said opposed edge being connected to either one said end or said opposed side of one said side panel by a seventh foldable joint.

56. The blank construction of claim 55 wherein said fourth end panel further includes a centrally located opening therein and said first end panel includes at least one notch adjacent said first cut-out adapted for exposing an edge of a compact disc positioned in first cut-out and adjacent said fourth end panel.

57. The blank construction of claim 56 wherein said sixth foldable joint, said first foldable joint, said second foldable joint and said third foldable joint comprise a single fold line, and said fourth foldable joint and said fifth foldable joint comprise two parallel fold lines.

58. A blank construction for making a compact disc package comprising:

a back panel having a pair of opposed sides and a pair of opposed ends;

a first end panel having a pair of opposed ends with one said opposed end being connected to one said end of said back panel by a first foldable joint;

a second end panel having a pair of opposed ends and having an arcuate first cut-out therein adapted to receive and position a compact disc therein and with one said opposed end being connected to said other opposed end of said back panel by a second foldable joint;

a third end panel having a pair of opposed ends and a centrally located second cut-out therein and adapted to be foldable along a fourth foldable joint to partially cover said first cut-out in said second end panel and with one said opposed end being connected to said other opposed end of said second end panel by a third foldable joint, said second cut out extending inwardly from said third foldable joint; and, at least one side panel having a pair of opposed sides with one said opposed side being connected to one said opposed side of said back panel by a fifth foldable joint.

59. The blank construction of claim 58 wherein said back panel, said second end panel, said third end panel and said side panel are substantially rectangular.

60. The blank construction of claim 58 further including a second side panel having opposed sides with one said opposed side being connected to said other opposed side of said back panel by a sixth foldable joint.

61. The blank construction of claim 60 further including at least one flap panel having two pairs of opposed edges with one said opposed edge being connected to either one said end or said opposed side of one said side panel by a seventh foldable joint.

62. The blank construction of claim 61 wherein said first end panel further includes a centrally located opening therein and said second panel includes at least one notch adjacent said first cut-out adapted for exposing an edge of a compact disc positioned in said first cut-out.

63. The blank construction of claim 62 wherein said first foldable joint, said second foldable joint, said third foldable joint and said fourth foldable joint comprise a single fold line, and said fifth foldable joint and said sixth foldable joint comprise two parallel fold lines.

64. A package for storing a compact disc package comprising:

a back panel having a pair of opposed sides and a pair of opposed ends;

a first end panel disposed adjacent to one said opposed side of said back panel folded onto said back panel along a first foldable joint formed between said bottom panel and said back panel;

a second end panel having a substantially circular first cut-out therein for receiving and positioning a compact disc therein and disposed adjacent to said other opposed end of said back panel folded onto said folded first end panel along a second foldable joint formed between said second end panel and said back panel;

a third end panel having a centrally located second cut-out therein folded along a fourth fold joint and to partially cover said first cut-out in said second end panel and disposed adjacent to one said opposed end of said second end panel and further folded onto said folded second end panel along a third foldable joint formed between said second end panel and said second third end panel; and, at least one side panel disposed adjacent to one said opposed side of said back panel folded onto said folded third end panel along a fifth foldable joint formed between said side panel and said back panel.

65. The package of claim 64 wherein said back panel, said first end panel, said second end panel, said third end panel and said side panel are substantially rectangular.

66. The package of claim 65 further including a second side panel having opposed sides with one said opposed side being connected to said other opposed side of said back panel by a sixth foldable joint.

67. The package of claim 66 further including at least one flap panel having two pairs of opposed edges with one said opposed edge being connected to either one said end or said opposed side of one said side panel by a seventh foldable joint.

68. The package of claim 67 wherein said first end panel further includes a centrally located opening therein and said second end panel includes at least one notch adjacent said first cut-out adapted for exposing an edge of a compact disc positioned in said first cut-out.

69. The package of claim 68 wherein said first foldable joint, said second foldable joint, said third foldable joint and said fourth foldable joint comprise a single fold line, and said fifth foldable joint and said sixth foldable joint comprise two parallel fold lines.

70. The package of claim 69 wherein said second end panel includes an adhesive thereon for adhering it to said first end panel, said third end panel includes an adhesive for adhering it to said second end panel and said flap panels include an adhesive for adhering each to each said side panel.

71. A blank construction for making a compact disc package comprising:

a back panel;

an integral first panel having a first arcuate cut-out adapted to receive and hold a compact disc therein and foldable onto said back panel along a first foldable joint; and, an integral second panel having a second cut-out therein extending inwardly from a foldable joint thereon and adapted to partially cover said first cut-out and foldable onto said first panel and back panel along a second foldable joint.

72. The blank construction of claim 71 further including an integral third panel foldable directly onto said back panel along a third foldable joint and an integral fourth panel foldable onto said folded first panel, second panel, third panel and back panel along a fourth foldable joint.

73. The blank construction of claim 72 wherein said third panel further includes a centrally positioned opening therein.

74. The blank construction of claim 72 wherein said first panel includes at least one notch adjacent said first cut-out adapted for exposing an edge of a compact disc positioned in said first cut-out and adjacent said third panel folded onto said back panel.

75. The blank construction of claim 74 wherein said first panel further includes at least one crease therein adjacent said first cut-out for forming a pucker in said first panel.

76. The blank construction of claim 71 further including an integral flap panel foldable onto said fourth panel along a fifth foldable joint.

* * * * *